(12) United States Patent
Kim et al.

(10) Patent No.: US 7,822,320 B2
(45) Date of Patent: Oct. 26, 2010

(54) METHOD AND APPARATUS FOR CREATING STILL PICTURE MANAGEMENT DATA AND RECORDING STILL PICTURES ON A RECORDING MEDIUM

(75) Inventors: Byung-Jin Kim, Kyunggido (KR); Kang-Soo Seo, Kyunggido (KR); Soung Hyun Um, Seoul (KR)

(73) Assignee: LG Electronics Inc., Seoul (KR)

( * ) Notice: Subject to any disclaimer, the term of this patent is extended or adjusted under 35 U.S.C. 154(b) by 1093 days.

(21) Appl. No.: 10/425,714

(22) Filed: Apr. 30, 2003

(65) Prior Publication Data

US 2004/0126098 A1 Jul. 1, 2004

Related U.S. Application Data

(63) Continuation-in-part of application No. 10/321,362, filed on Dec. 18, 2002, which is a continuation of application No. 09/339,050, filed on Jun. 23, 1999, now Pat. No. 6,519,415.

(30) Foreign Application Priority Data

Jun. 23, 1998 (KR) .................................. 98-23777

(51) Int. Cl.
*H04N 7/26* (2006.01)
*H04N 5/91* (2006.01)
*H04N 7/00* (2006.01)
*H04N 5/00* (2006.01)

(52) U.S. Cl. .................. 386/109; 386/95; 386/125; 386/126

(58) Field of Classification Search ............... 386/4, 386/40, 45, 46, 69, 83, 95, 97, 98, 105, 106, 386/112, 120, 121, 125, 126; 348/231.1, 348/231.2, 231.3, 588; 715/501.1
See application file for complete search history.

(56) References Cited

U.S. PATENT DOCUMENTS 4,613,908 A * 9/1986 Takahashi et al. ............. 386/21

(Continued)

FOREIGN PATENT DOCUMENTS

CN 1240293 1/2000

(Continued)

OTHER PUBLICATIONS

Japan Electronic Industry Development Association Standard, Design rule for Camera File system, Version 1.0, JEIDA-49-2-1998, established Dec. 1998, pp. 1-39.

*Primary Examiner*—Thai Tran
*Assistant Examiner*—Hung Q Dang
(74) *Attorney, Agent, or Firm*—Birch, Stewart, Kolasch & Birch, LLP

(57) ABSTRACT

The present invention relates to a method of grouping still pictures recorded on a recording medium for the purpose of efficient management. The present method records still pictures onto a recording medium, groups the recorded still pictures based on their attributes and attributes of recorded audio data associated with respective still pictures, creates management information about each still-picture group, and writes the group management information onto the recording medium. Owing to the recorded group management information, a user can easily and rapidly find many still pictures on a recording medium that have been obtained in the same photographing condition.

35 Claims, 19 Drawing Sheets

U.S. PATENT DOCUMENTS

| | | | | |
|---|---|---|---|---|
| 4,633,329 | A | * | 12/1986 | Sugiyama et al. .............. 386/40 |
| 5,517,476 | A | * | 5/1996 | Hayashi ................... 369/59.22 |
| 5,675,358 | A | | 10/1997 | Bullock et al. |
| 5,745,643 | A | * | 4/1998 | Mishina ...................... 386/106 |
| 5,796,428 | A | * | 8/1998 | Matsumoto et al. ......... 348/588 |
| 5,806,072 | A | | 9/1998 | Kuba et al. |
| 5,895,123 | A | | 4/1999 | Fujii et al. |
| 6,088,507 | A | | 7/2000 | Yamauchi et al. |
| 6,108,423 | A | * | 8/2000 | Sako et al. .................. 380/203 |
| 6,141,044 | A | | 10/2000 | Anderson et al. |
| 6,353,703 | B1 | * | 3/2002 | Tatsumi et al. .............. 386/104 |
| 6,519,415 | B1 | * | 2/2003 | Kim et al. ................... 386/105 |
| 6,871,004 | B1 | * | 3/2005 | Bando ......................... 386/46 |
| 7,107,516 | B1 | * | 9/2006 | Anderson et al. ........ 715/501.1 |

FOREIGN PATENT DOCUMENTS

| | | |
|---|---|---|
| EP | 0 847 195 A1 | 6/1998 |
| JP | 06-149905 | 5/1994 |
| JP | 6324934 | 11/1994 |
| JP | 2001-054041 A | 2/2001 |
| JP | 2001-157155 A | 6/2001 |
| JP | 2001-211418 A | 8/2001 |
| KR | 2000-0006198 | 1/2000 |

\* cited by examiner

FIG.1
BACKGROUND ART

| | | | |
|---|---|---|---|
| Video Manager Information (VMGI) | | | |
| Movie AV File Information Table (M_AVFIT) | | | |
| Still Picture AV File Information (S_AVFIT) | Still Picture AV File Information Table Information (S_AVFITI) | | S_AVFI_Ns |
| | | | S_AVFIT_EA |
| | Still Picture AV File Information (S_AVFI) | Still Picture AV File Information General Information (S_AVFGI) | S_VOBI_Ns |
| | | Still Picture VOB information #i (S_VOB #i) | VOB_ID |
| | | | VOB_TY |
| | | | ⋮ |
| Original PGC Information Table (ORG_PGCIT) | Original PGC Information Table Information (ORG_PGCITI) | | ORG_PGC_SRP_Ns |
| | | | ORG_PGCIT_EA |
| | Original PGC Search Pointer (ORG_PGCI_SRP) | | ORG_PGC_SA |
| | Original PGC Information (ORG_PGCI) | PGC General Information (PGCI) | C_Ns |
| | | Cell Information #i (CI #i) | C_TY |
| | | | VOB_ID |
| | | | ⋮ |
| User Defined PGC Information Table (UD_PGCIT) | | | |
| Text Data Manager (TXT_DT_MG) | | | |
| Manufacturer's Information Table (MNFIT) | | | |

FIG.6

| S_VOBI #i | S_VOBGI | VOB_ID |
| | | VOB_TY |
| | | VOB_PB_TM |
| | | VOB_REC_TM |
| | | STILL_PIC_Ns |
| | S_VOB_STI | V_ATR |
| | | A_ATR |
| | PART_OF_VOBI | V_PARTI | V_PART_S_ADR #1 |
| | | | V_PART_SZ #1 |
| | | | V_PART_SZ #2 |
| | | | ......... |
| | | | V_PART_SZ #S |
| | | A_PARTI | A_PART_S_ADR #1 |
| | | | A_PART_SZ #1 |
| | | | A_PART_SZ #2 |
| | | | ......... |
| | | | A_PART_SZ #S |

FIG.7

| CI #i | C_TY | C_TY |
| | S_CI | VOB_ID |
| | | C_PB_TM |
| | | PIC_S_N (=K) |
| | | PIC_E_N (=K+L-1) |
| | | PIC_STILL_TM |
| | | PIC_PB_TM #1 |
| | | PIC_PB_TM #2 |
| | | ......... |
| | | PIC_PB_TM #L |
| | | IT_TXT_N |
| | | THMNL_N |

FIG.18
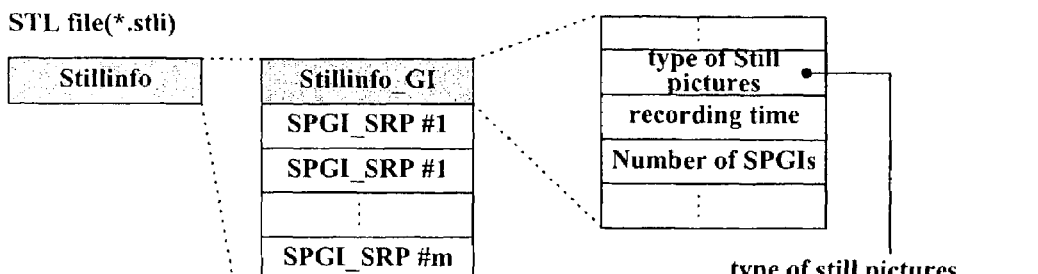
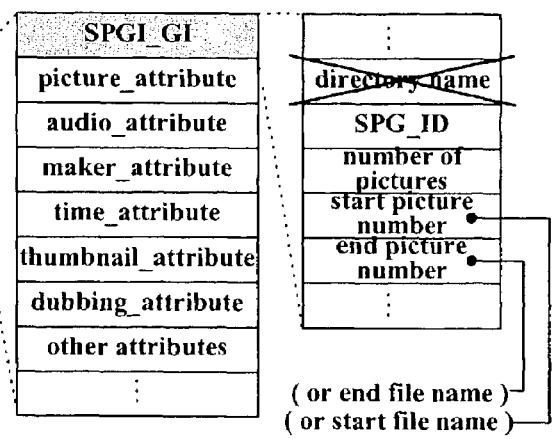
FIG.19
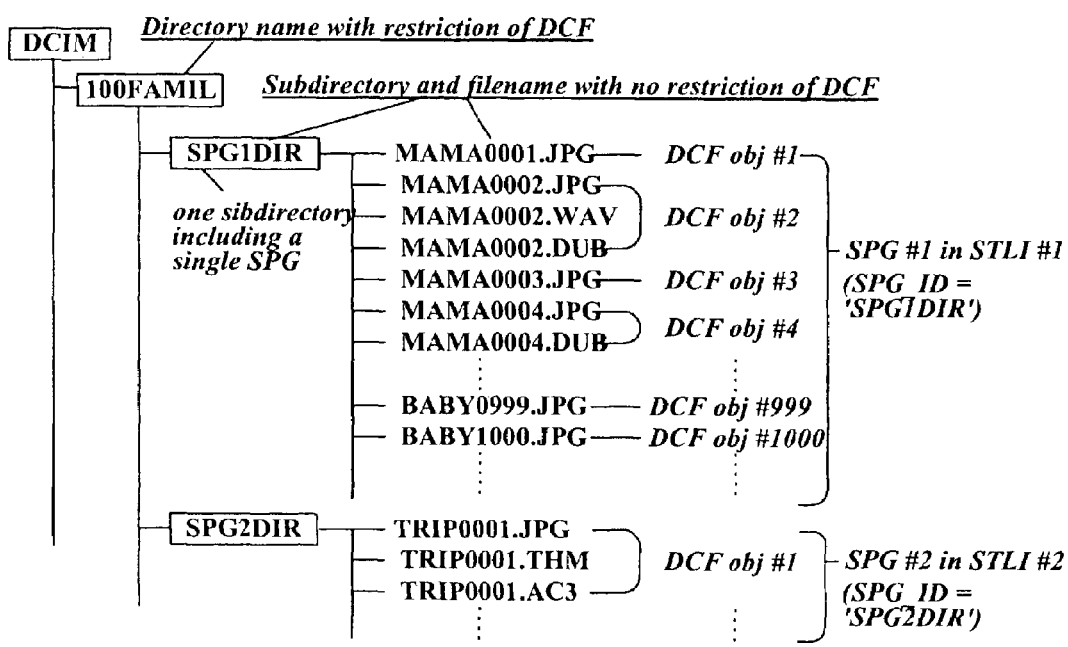

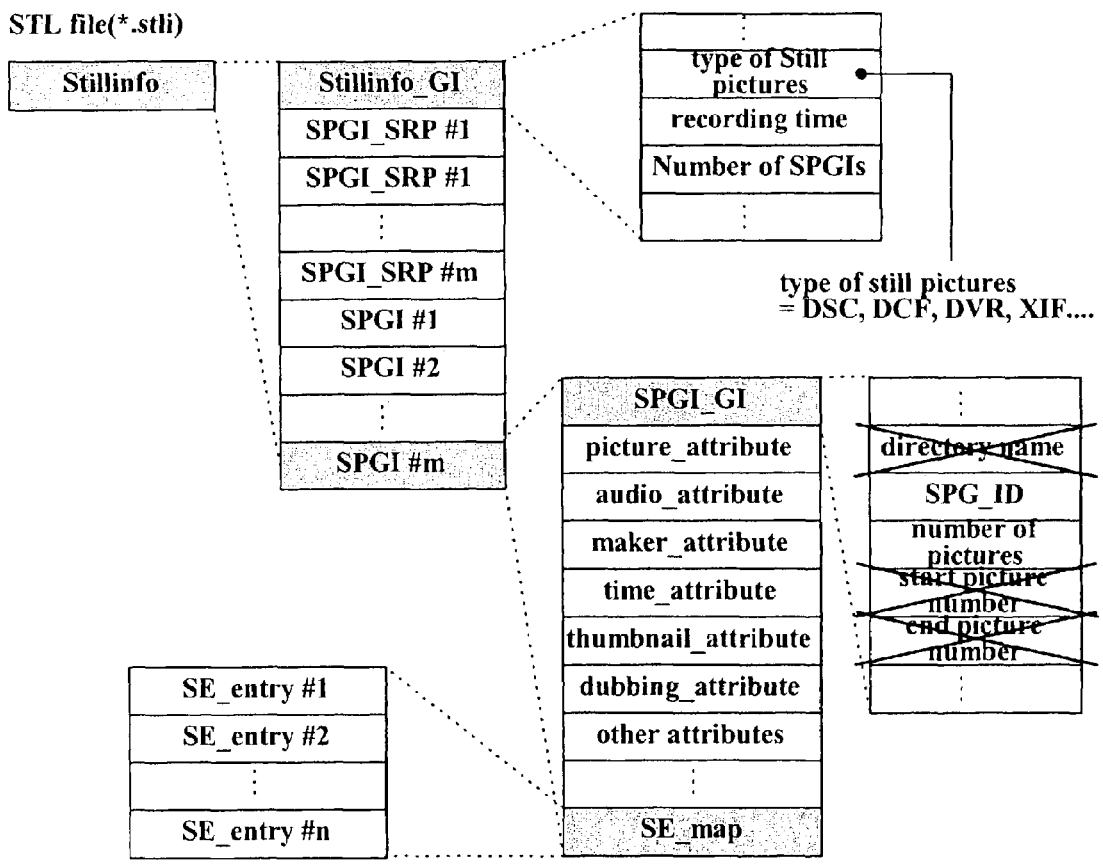

METHOD AND APPARATUS FOR CREATING STILL PICTURE MANAGEMENT DATA AND RECORDING STILL PICTURES ON A RECORDING MEDIUM

RELATED APPLICATION

The present application is a Continuation-in-Part (CIP) application of U.S. application Ser. No. 10/321,362 filed on Dec. 18, 2002, which is a continuation application of U.S. application Ser. No. 09/339,050 filed Jun. 23, 1999, now U.S. Pat. No. 6,519,415 B1, the entire contents of each of these applications are herein incorporated by reference.

BACKGROUND OF THE INVENTION

1. Field of the Invention

The present invention relates generally to a method and apparatus for creating still picture management data on a rewritable storage media and recording the still pictures on the media, and more particularly, but not by way of limitation, to a method and apparatus capable of reducing the amount of navigation information and index information needed to record still pictures on a rewritable storage media and to a method of grouping still pictures recorded on a recording medium for efficient management.

2. Brief Description of the Background Art

Currently, a great number of optical disks are being used in various fields. With the advent of the DVD (Digital Versatile Disc), it is expected that more and more optical disks will come into use. Optical disks currently include read-only disks such as the CD-ROM and DVD-ROM and record-once disks such as the CD-R and DVD-R. In addition, specifications for rewritable optical disks such as the CD-RW, DVD-RAM, and so forth are under discussion.

Since, rewritable optical disks like the DVD-RAM have very large capacity, they can store a good many moving/still images. When moving/still images are recorded on a rewritable storage media, information for search and retrieval of the images is created and recorded in a navigation information file on the storage media.

The structure of the navigation information file is as shown in FIG. 1, wherein the VOB (Video Object) information field and cell information field are created and inserted in the navigation information file, each time a moving or still image is recorded on the storage media. When reproducing images, the navigation information file is loaded into a memory and a requested moving or still image is searched for and reproduced from the storage media based on the navigation information.

Since still pictures are much smaller in size than moving pictures, a large number of still pictures can be recorded in a storage media—for example, a 4.7 GB storage media can store more than 60 thousand still pictures. Therefore, when a high-capacity storage media is filled with only still pictures, the amount of necessary navigation information increases relative to the stored still images. When a still picture or audio data linked to the still picture is recorded, the two information fields in FIG. 1 (i.e., VOB information and cell information (CT) fields) take up 84 bytes (e.g., S_VOB (36 bytes)+Cell (2×24 bytes)) including the reserved area. In the above example, therefore, the size of the two information fields needed to store 60 thousand still pictures is 5040 KB (84× 60000). FIG. 2 shows the relation between VOB information and cell information created when still pictures are recorded.

As a result, even when limited to storage of still pictures, the size of the navigation information file in a storage media exceeds 5 MB. As mentioned above, the navigation information file needs to be loaded into a memory and searched to locate and retrieve a requested still picture from the media; hence a large memory is required merely to store the navigation information temporarily. If the size of the memory is limited, for example less than 512 Kbytes, the number of still pictures to be recorded should also be limited despite the large capacity of the storage media, which is a major problem of the conventional still picture management method.

A disk-type recording medium such as a compact disk (CD) can store high-quality digital audio data permanently, so that it is a very popular recording medium. Recently, a DVD has been developed as a new disk-type recording medium. A DVD can store a much larger quantity of information than a CD. Thus, a high-quality moving picture or audio data can be recorded on a DVD for a much longer time than on a CD. Therefore, DVDs will likely be used more widely than CDs in the near future.

Generally, there are three types of DVDs: DVD-ROMs are read-only DVDs, DVD-Rs are write-once DVDs, and DVD RAMs or DVD-R/Ws are rewritable DVDs. For the rewritable DVDs, a standardization of data writing format is currently being developed.

Recently, Digital Still Cameras (DSCs) capable of storing pictures containing digital data have been developed. Such DSCs usually have a memory chip of large storage capacity so that it can take high-quality pictures and store audio data associated with the stored pictures as well. In a DSC, the taken pictures are encoded in the format of JPEG, or TIFF while the audio data are done in the format of PCM, u-Law PCM, or IMA-ADPCM.

A DSC has a well-known file system called a 'DCF' (Design rule for Camera File system) for recording still pictures and audio data. FIG. 3 shows a background art arrangement of a DCF. In the structure of DCF, a DCIM (Digital Camera Images) directory exists under a root directory and many subdirectories may exist under the DCIM. Each subdirectory may have an 8-digit-long filename that is composed of three numeric digits and five character digits, for example. The three numeric digits should be unique, for instance, one among 100 to 999, and the five character digits are arbitrarily chosen by a user. Because the three numeric digits are unique the subdirectories can be created up to 900.

A subdirectory, e.g., subdirectory '100ABCDE' of FIG. 3 can accommodate many data files of which a filename may be 8-digits long. The filename may be composed of four numeric digits and four character digits, for example. While the four character digits are chosen by a user the four numeric digits should be unique among data files if their attributes are different. The data files are still pictures and/or audio files, respectively. The still picture files typically have an extension of 'JPG' or 'TIF' with their filenames while the audio files encoded by PCM, u-Law PCM or IMA-ADPCM typically have an extension of 'WAV' with their filenames. The filenames of the data files can be same if their extensions are different. Therefore, when a picture file is to be dubbed with audio, a dubbed audio file can be linked with the picture file only if their filenames are the same.

A digital video recorder (DVR) records video and audio data in a background art file structure shown in FIG. 4. The file structure of FIG. 4 has a DVR directory under a root directory. The DVR directory includes a menu file 'menu.tdat', a mark file 'mark.tdat', and their index files 'menu.tidx' and 'mark.tidx'. The menu and the mark files have menu data and mark data respectively and the index files have search data to index menu and mark data in the menu and the mark file.

The 'DVR' directory is mandatory for motion picture recording of a DVR. The 'DVR' directory has directories 'PLAYLIST', 'CLIPINF', and 'STREAM'. The 'PLAYLIST' directory includes playlist files (*.rpls,*.vpls) containing motion-picture and still-picture play items and title management information. The directory 'CLIPINF' includes clip information files (*.clpi) containing information on movie stream management and movie attribute. The directory 'STREAM' includes stream files (*.m2ts) containing actual motion-picture data stream packets.

However, many still pictures obtained with a DSC under the file system of FIG. 3 are moved to a recording medium of very large capacity because of relatively small storage capacity of a DSC. That is, numerous still pictures taken by a DSC will be recorded onto a large-capacity recording medium through a DVR capable of recording data onto that medium. This fact strongly demands a DVR that uses an efficient still-picture management method.

SUMMARY OF THE INVENTION

The present invention is directed to a system that substantially obviates one or more of the problems experienced due to the above and other limitations and disadvantages of the background art.

It is an object of the present invention to provide a method and apparatus for creating and recording still picture management data in a rewritable storage media, which remarkably reduces the size of necessary still picture management data by sharing navigation information of a plurality of still pictures.

It is an object of the present invention to provide several methods that record still pictures onto a recording medium and create and write their management information in order to ensure efficient access.

Other and further objects, features and advantages of the present invention will be set forth in the description that follows, and in part will become apparent from the detailed description, or may be learned by practice of the invention.

To achieve these and other advantages and in accordance with the purpose of the present invention, as embodied and broadly described, the present invention includes a method for recording pictures such as still pictures on a rewritable storage media including recording obtained still pictures in sequence; examining conditions for grouping the recorded still pictures into single video object (VOB); and creating and recording navigation information for the still pictures grouped according to the examination result. Furthermore, the method for recording still pictures and audio signals linked to the still pictures on a rewritable storage media includes recording obtained still pictures and/or audio signals which will be reproduced together with correspondent still pictures; examining conditions of sill pictures or audio signals for grouping the recorded still pictures and/or audio signals into single data object which may consist of only audio data instead of only video or mixed data; and creating and recording of navigation information for the still pictures and/or audio signals grouped according to the examination result.

In addition, the present invention includes a rewritable storage device, the contents of the rewritable storage device including several or recorded pictures, one or more groups of the recorded pictures having one or more common attributes; and navigation information used to identify the groups of recorded pictures based on the common attributes shared by the pictures within the groups. The recorded pictures are generally still pictures, and the number of pictures in a group is generally limited to a present maximum number. The navigation information includes information on a start address of a corresponding group identified by the navigation information and information on sizes of the still pictures within the group identified by the navigation information. The information on the sizes of the still pictures within the group is recorded sequentially according to a recording order of the still pictures within the group, the information on the sizes on the sizes identifying the size of more than one still picture within the group.

In the present invention, conditions for grouping the recorded still pictures and audio signals linked to the still pictures which into VOBs include attributes of the still pictures and audio signals and the maximum number of still pictures which a VOB can contain.

In another aspect of the present invention, a method of recording a still picture onto a recording medium includes recording still pictures onto a recording medium in a DCF structure defined for a digital still camera or in a file structure defined for a digital video recorder; and creating management information to access the recorded still pictures, and writing the management information onto the recording medium.

It is to be understood that both the foregoing general description and the following detailed description are exemplary and explanatory and are intended to provide further explanation of the invention as claimed. Thus, it should be understood that the detailed description and specific examples, while indicating preferred embodiments of the invention, are given by way of example only. Various changes and modifications that are within the spirit and scope of the invention will become apparent to those skilled in the art from this detailed description. In fact, other objects, features and characteristics of the present invention; methods, operation and functions of the related elements of the structure; combinations of parts; and economies of manufacture will surely become apparent from the following detailed description of the preferred embodiments and accompanying drawings, all of which form a part of this specification, wherein like reference numerals designate corresponding parts in various figures.

BRIEF DESCRIPTION OF THE DRAWINGS

The accompanying drawings, which are included to provide a further understanding of the invention, illustrate the preferred embodiment of this invention, and together with the description, serve to explain the principles of the present invention.

In the drawings:

FIG. 1 is a view of the structure of a background art navigation information file;

FIG. 6 is an example of the data format of the video object information (VOBI) shown in FIG. 5 according to the present invention;

FIG. 7 is an example of the data format of the cell information shown in FIG. 5 according to the present invention;

FIGS. 16 to 18 show a schematic still-picture recording process and group management information related with a still picture grouping in accordance with a second embodiment of the present invention;

FIG. 19 shows a file recording example and partial group management information related with a still picture grouping in accordance with a third embodiment of the present invention;

FIGS. 23 to 26 show a schematic still-picture recording process and group management information related with a still picture grouping in accordance with the fifth embodiment of the present invention.

DETAILED DESCRIPTION OF THE PREFERRED EMBODIMENTS

Figure 2:
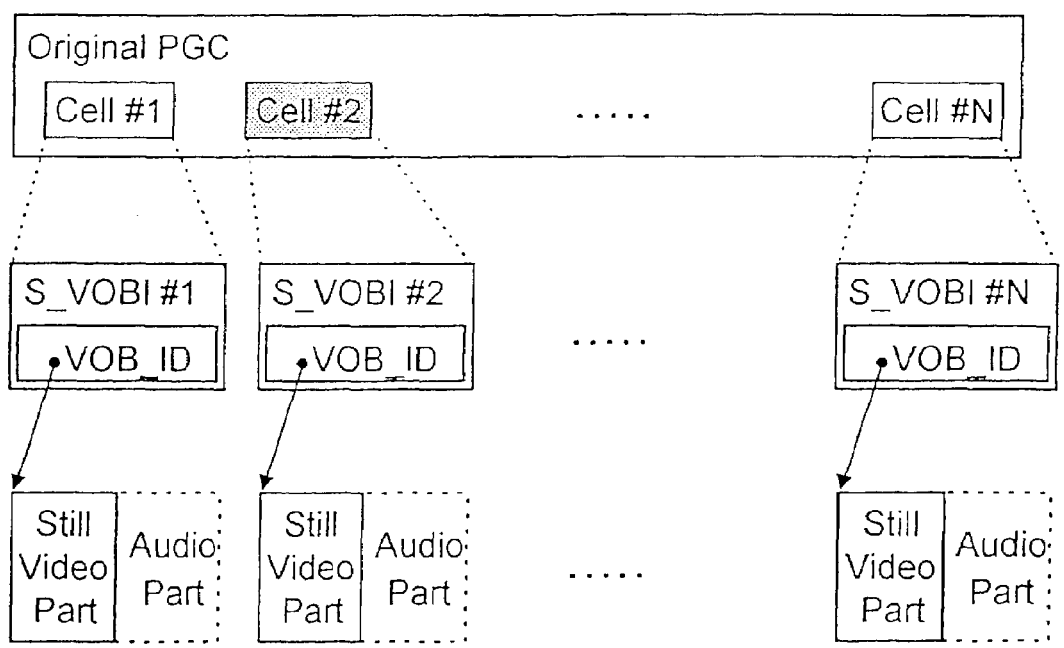
FIG. 2 is a view of creating navigation information in a background art still picture management method.

Reference will now be made in detail to the preferred embodiments of the present invention, examples of which are illustrated in the accompanying drawings. In the drawings, redundant description of like elements and processes, which are designated with like reference numerals, is omitted for brevity.

Figure 5:
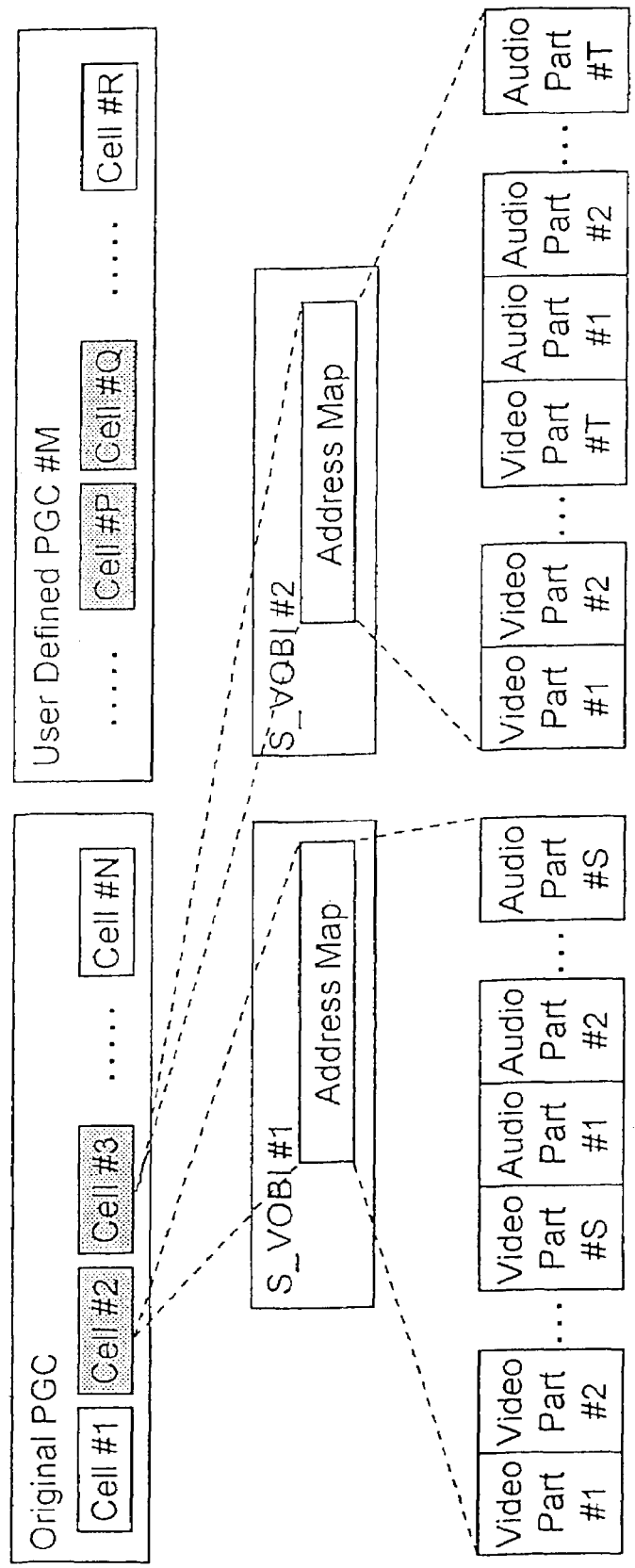
FIG. 5 is a view of the structure of still picture management data as an embodiment according to the present invention.

FIG. 5 shows an example of the structure of still picture management data according to the present invention. The program chain (PGC) is composed of an original PGC and a user-defined PGC, each of which comprises a plurality of movie cells and still picture cells. The video object information (VOBI) is the information for reproducing a video object (VOB). Each VOBI (S_VOBI #1~S_VOBI #N) has an address map containing addresses of video parts (Video Part #1~Video Part #S) and audio parts (Audio Part #1~Audio Part #S) of a plurality of still pictures pertaining to the corresponding VOB. The VOB includes video parts (Video Part #1~Video Part #S) of still pictures and audio parts (Audio Part #1~Audio Part #S) linked to the video parts, wherein the video parts are first recorded in order of the inputted still pictures and then the audio parts linked to the video parts are recorded in the same order. Similarly, the addresses of the video parts and audio parts linked to the video parts are recorded in the address map of each VOBI (S_VOBI #1~S VOBI #N) in order of the inputted still pictures.

A still picture may contain only a video part or both a video part and an audio part linked to the video part, depending on whether audio data are obtained together when the still picture is taken. According to the present invention, a VOB comprises a group of still pictures with common attributes, which are categorized into video attributes and audio attributes.

Figure 8A:
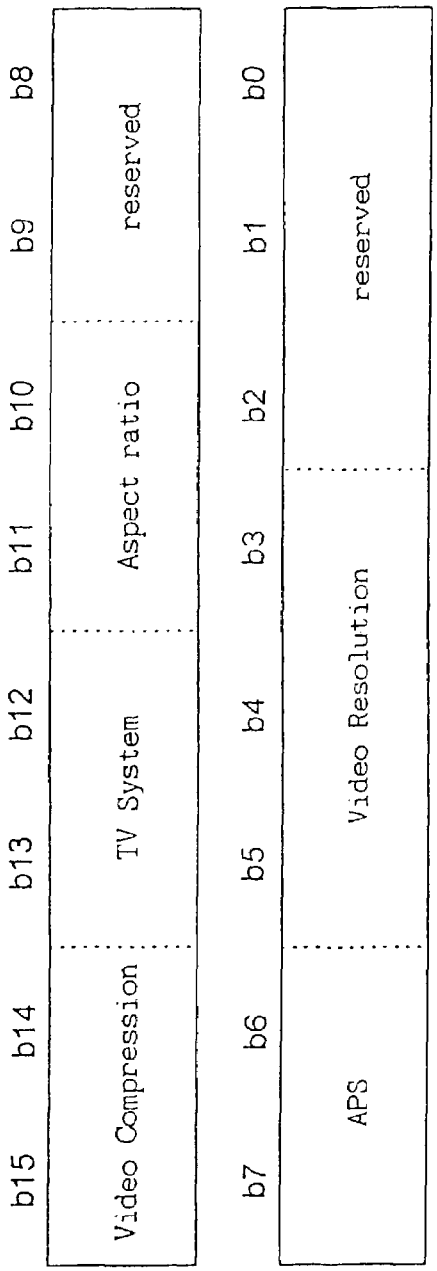
FIGS. 8A and 8B are examples of the data format of the video attribute (V_ATR) and audio attribute (A_ATR) shown in FIG. 6 according to the present invention.

As shown in FIG. 8A, video attributes include the video compression mode (MPEG 1, MPEG 2, etc.), TV system mode (525/60, 625/50, etc.), aspect ratio (4:3, 16:9, etc.), analog protection system APS (on or off), video resolution (720×480, 704×480, 352×480, 352×240, etc.), and the like.

Figure 8B:
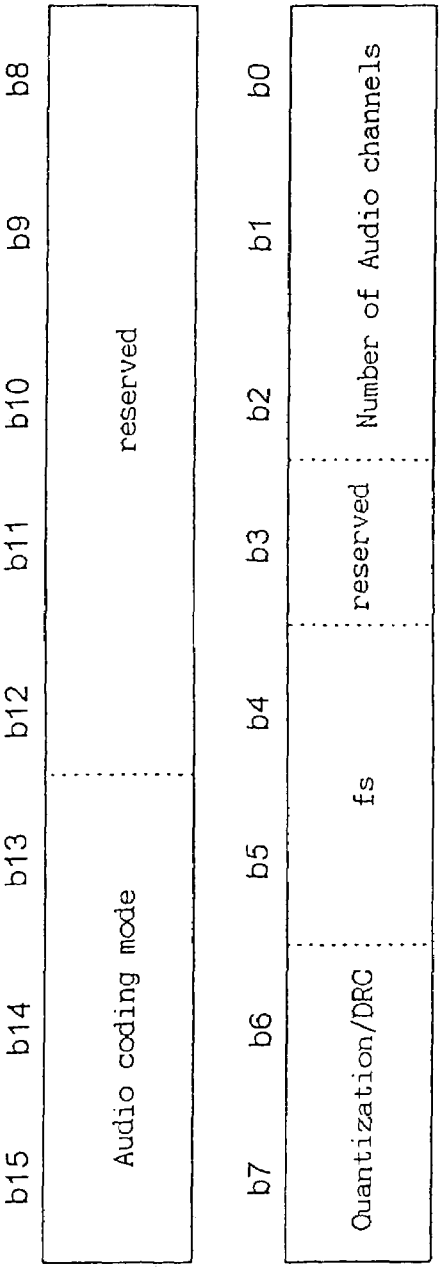

As shown in FIG. 8B, audio attributes include the audio coding mode (Dolby, MPEG-1, MPEG-2, linear PCM audio, etc.), quantization/dynamic range control (DRC), sampling frequency, number of audio channels (mono, stereo, dual mono, etc.), and the like.

Considering the fact that a user may take many still pictures with the attributes fixed, the above grouping method might cause the problem that too many still pictures are included in a VOB, which makes search of still pictures difficult. Motivated by this, the present invention contemplates grouping still pictures according to their attributes and also limiting the maximum number of still pictures that a VOB can contain, thereby not only reducing the size of still picture management data but facilitating search of still pictures. The maximum number of still pictures pertaining to a VOB can be, for example, 32, 64, 128, etc. The attributes of still pictures can be set or changed by a user when the pictures are taken using photographing apparatuses like digital cameras, or when the still pictures are edited using recording/reproduction apparatuses capable of recording still pictures.

As depicted in FIG. 5, the present invention can simplify the structure of still picture management data in that a plurality of still pictures are grouped according to their attributes and in that a group of still pictures can be represented by a single VOBI.

Figure 3:
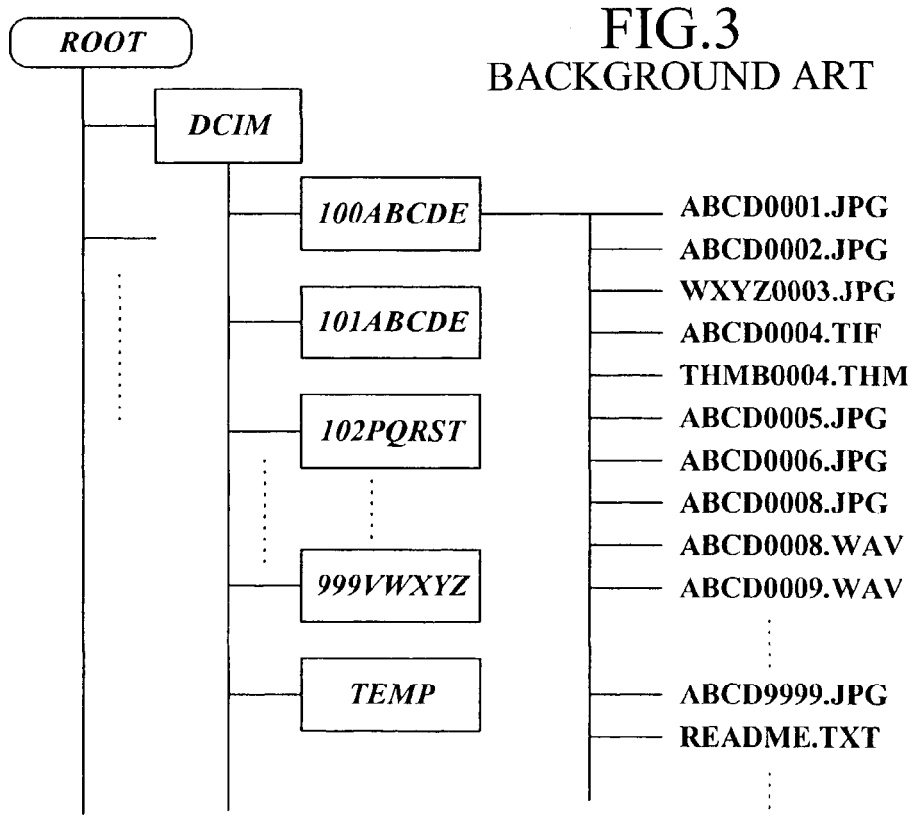
FIG. 3 shows a DCF adopted by a background art digital still camera.

FIG. 6 depicts an example of the data format of the VOBI shown in FIG. 3, wherein S_VOBI #I comprises S_VOBGI (still picture VOB general information), S_VOB_STI (still VOB stream information), and PART_OF_VOBI (part of VOBI) composed of V_PARTI (video part information) and A_PARTI (audio part information).

Furthermore, the S_VOBGI comprises VOB_ID (VOB identification code), VOB_TY (VOB type), VOB_PB_TM (VOB playback time), VOB_REC_TM (VOB recording time), and STILL_PIC_Ns (still picture numbers), which-is the number of still pictures grouped into a VOB and has a size of 2 bytes. The S_VOB_STI comprises V ATR (video attributes) configured as shown in FIG. 8A and A_ATR (audio attributes) configured as shown in FIG. 8B.

The V_PARTI is composed of V_PART_S_ADR #1 (video part start address) and V_PART_SZ #1~V_PART_SZ #S (sizes of video part #1~video part #S contained in the VOB). Likewise, the A PARTI is composed of A_PART S_ADR#1 (audio part start address) and A_PART_SZ #1~A_PART_SZ #S (sizes of audio part #1~audio part #N contained in the VOB). The A_PART_SZ #I may be 0, in which case the i-th still picture contains no audio part.

FIG. 7 shows an example of the data format of the cell information shown in FIG. 5, wherein CI #I (cell information #I) comprises C_TY (cell type) indicative of whether the corresponding cell is a still picture or a moving picture and S CI (still picture cell information). The S_CI comprises VOB_ID (VOB identification code), C_PB_TM (cell playback time), PIC_S_N (index number of the picture to be reproduced first), PIC_E_N (index number of the picture to be produced last), PIC_STILL_TM (holding time of each picture after being reproduced), PIC_PB_TM #1~PIC_PB_TM #L (playback times of picture #1~picture #L), IT_TXT_N (item text number), and THMNL_N (thumbnail picture number). If the number of still pictures (STILL_PIC_Ns) to be reproduced is L and the index of the picture to be reproduced first (PIC_S_N) is K, then the index number of the picture to be reproduced last (PIC_E_N) becomes K+L−1.

It was verified that the still picture management method according to the present invention remarkably reduces the amount of VOBI data created in a navigation information file, compared to the conventional method. More explicitly, in the case where 10 still pictures are recorded on a storage media, 360 bytes are needed for VOBI data in the conventional method while 74 bytes are needed in the method of the present invention, which amounts to 79%. VOBI data decrease.

Figure 9:
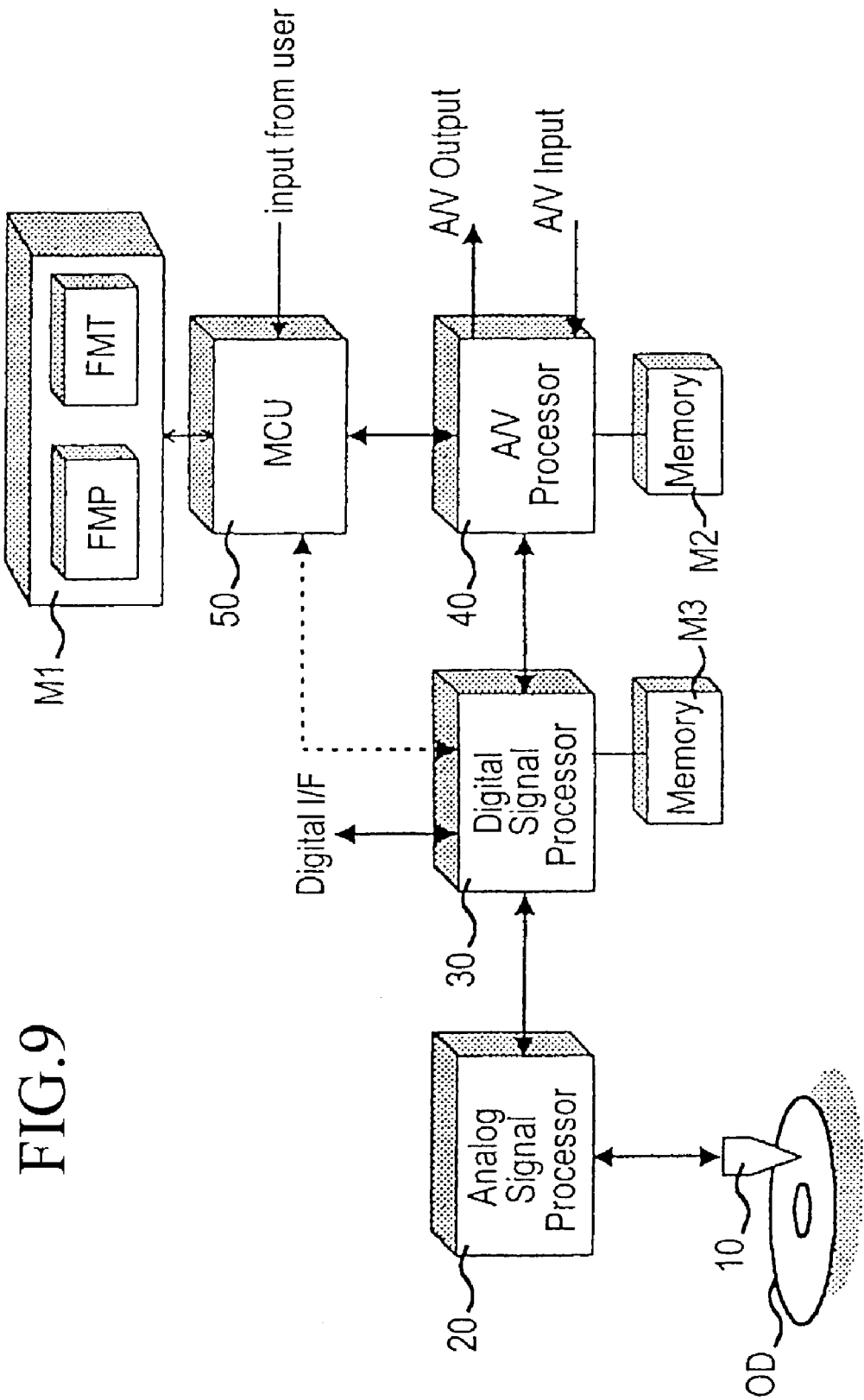
FIG. 9 is a schematic view of an information recording/reproduction apparatus to embody the method for creating and recording still picture management data of the present invention.

FIG. 9 is a schematic view of an optical information recording/reproduction apparatus, embodying the method for creating/recording still picture management data in a rewritable storage media according to the present invention.

The optical information recording/reproduction apparatus comprises an optical pickup 10 for recording information on an optical disk (OD) and detecting recorded information from the OD, an analog signal processing unit 20 for filtering and digitizing a reproduced high-frequency analog signal and for converting digital data into an analog signal to be recorded, a digital signal processing unit 30 for encoding and decoding the error correction code (ECC) block and issuing a control signal to the optical pickup 10 based on the data decoding result, an A/V processing unit 40 5 for decoding audio/video (A/V) data input and encoding an A/V signal into A/V data, a control unit 50 for controlling the above components and for controlling creation of navigation data for reproduction of A/V data, and multiple memory units M1, M2, and M3 for temporarily storing data generated during signal processing.

Figure 4:
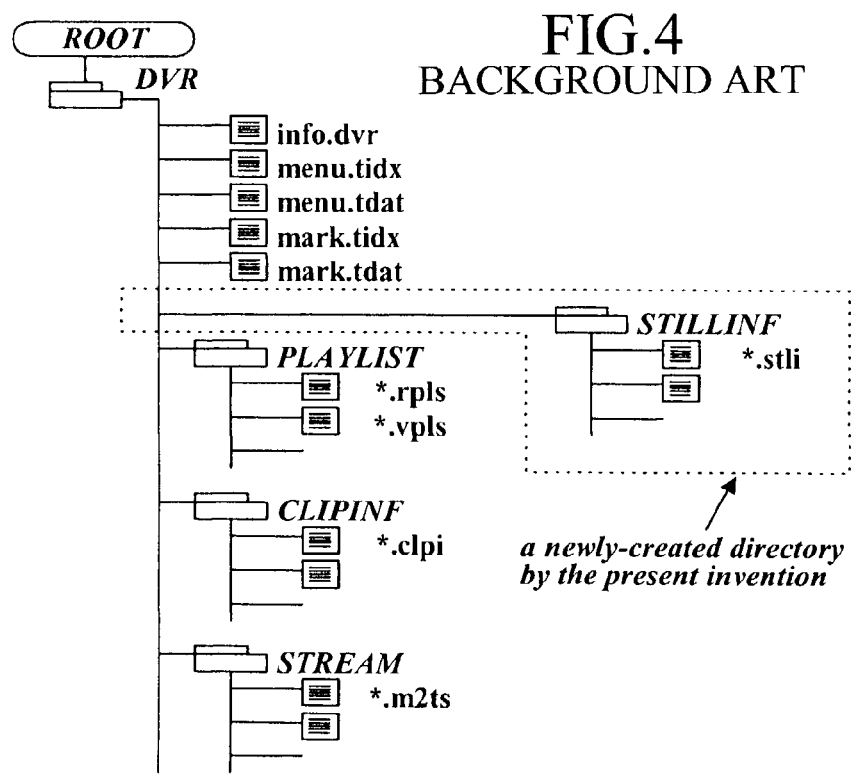
FIG. 4 shows a file system adopted by a background art digital video recorder.

The memory M1 contains an FMP area for storing a file management program (FMP) and an FMT area for storing a file management table (FMT), wherein the FMT contains a VOBI table composed of VOBIs as shown in FIG. 4 and a cell information table composed of CIs as shown in FIG. 7.

When still pictures are recorded on the OD shown in FIG. 7, the control unit 50 controls each component of the apparatus so that still pictures and audio signals linked to the still pictures can be properly recorded on the OD. The control unit 50 keeps examining whether the attributes of the still pictures or audio signals linked to the still pictures are changed by a user during the recording process. On detecting an attribute change, the control unit 50 groups the still pictures recorded before the attribute change into a VOB, completes creation of the VOBI related to the VOB, as shown in FIG. 6, and stores the created VOBI in the VOBI table in the FMT area of the memory Ml. On the other hand, if the number of recorded still pictures having attributes that remain unchanged reaches the maximum number preset by a user, the control unit 50 groups the still pictures and audio data linked to the still pictures into a VOB and repeats the aforementioned procedure. Also, in the case where power is out in the middle of acquisition of still pictures, the control unit 50 groups the still pictures and audio data linked to the still pictures recorded until then into a VOB, completes creation of the VOBI related to the VOB, and stores the created VOBI in the VOBI table in the FMT area of the memory M1. And then the navigation information stored in the memory Ml is recorded in the management data area of the OD.

Next, when reproduction of still pictures recorded on the OD are requested by a user, the file management program reads the PIC_S_N, PIC_E_N, PIC_STILL_TM, and PIC_PB_TM #1~PIC_PB_TM #L fields from the cell information table stored in the FMT area (see FIG. 7). Based on the obtained cell information, the control unit 50 controls each component of the apparatus so that still pictures recorded on the OD can be reproduced sequentially.

Figure 10:
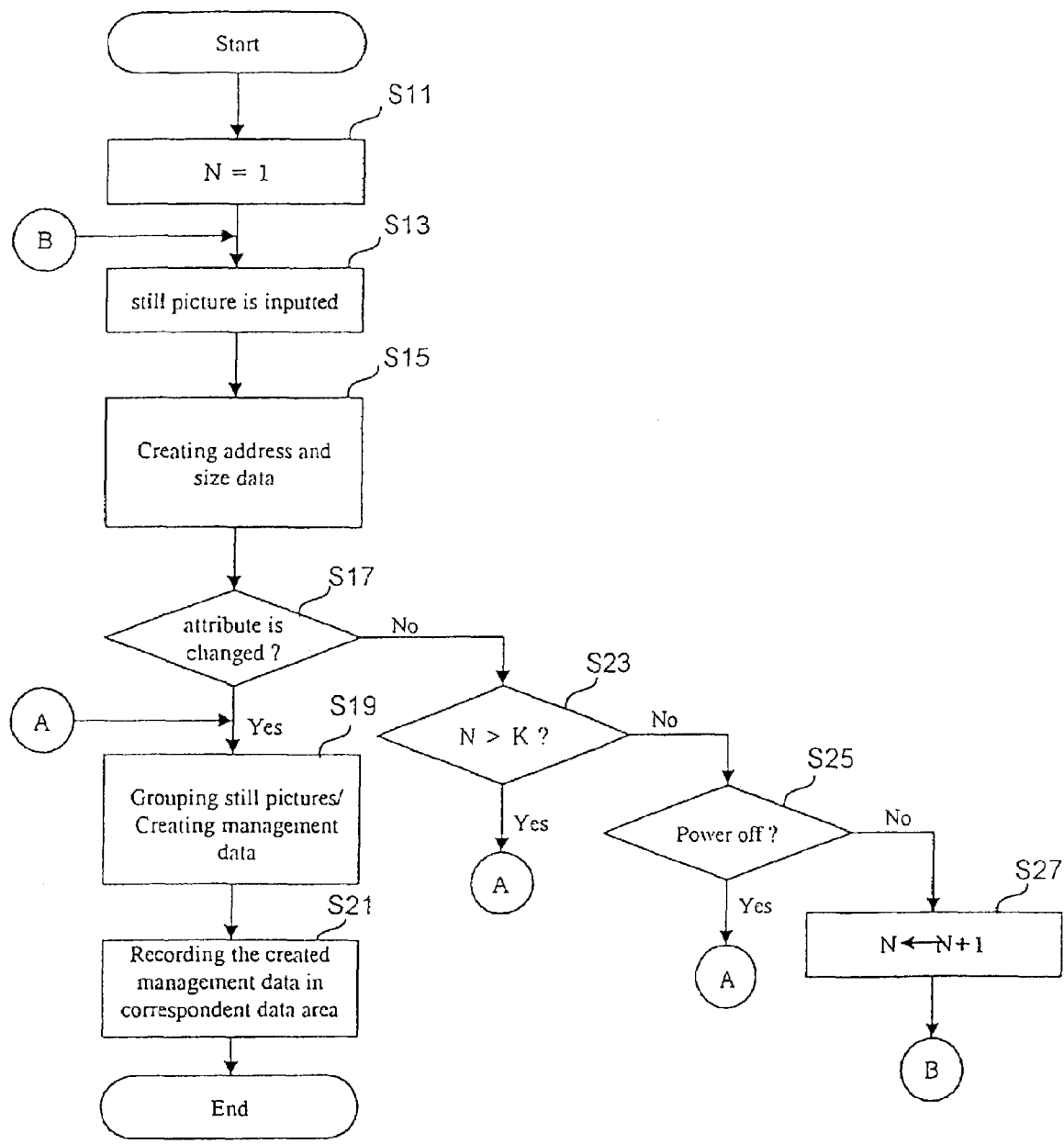
FIG. 10 is a flowchart of the method for creating and recording still picture management data of the present invention.

The method for creating/recording still picture management data in a rewritable storage media according to the present invention will be explained in detail in reference to the flow chart shown in FIG. 10.

Once a still picture recording mode has been set by a user, the control unit 50 first sets the number N of still pictures as 1 in an internal register (S11) and controls each component of the apparatus so that a still picture is recorded on the storage media (S13).

As the recorded still picture is the first element of the corresponding VOB, the file management program creates a VOBI in the FMT area of the memory M1 and records start addresses of video and audio parts of the still picture and their sizes in the fields of V_PART_S_ADR #1, A_PART_S_ADR #1, V_PART_SZ #1, and A PART_SZ #1 in the VOBI, respectively (S15).

Next, the control unit 50 examines whether the attributes of the currently recorded still picture (or attributes of the audio data linked to the still picture) differ from those of the previously recorded still pictures (or those of the audio data linked to the previously recorded still pictures) belonging to a VOB (S17). If the attributes remain unchanged, the control unit 50 examines the internal register to confirm that the number of still pictures recorded so far (N) does not exceed a preset maximum number (K). If the number of still pictures recorded in the group exceed the preset maximum number (K), the control unit 50 examines whether power is out (S25). However, if the number of still pictures recorded in the group do not exceed the present maximum number (K), the control unit 50 executes step S19 explained later.

Provided power-off is detected in the step S25, the control unit 50 executes S19 explained later. If not, it increments the number N of recorded still pictures by 1 in step S27 and returns to S13 to repeat the aforementioned procedure. In this case, however, sizes of video and audio parts of the still picture are recorded in the corresponding fields of the existing VOBI without creating a new VOBI since the still picture is not the first element of the VOB to which the still picture belongs.

Returning to S17, if the attributes of the currently recorded still picture differ from those of the previously recorded still pictures, the control unit 50 groups the previously recorded still pictures into a VOB in step S19, records N in the field of STILL_PIC_Ns in the corresponding VOBI after decrementing N by 1, and finishes creation of the VOBI. Along with this, the control unit 50 creates a CI, as shown in FIG. 7, corresponding to the created VOBI and records it in the FMT area of the memory M1. Also, the control unit 50 deletes from the completed VOBI the size information of the last still picture recorded by S15 and creates a new VOBI in the FMT area of the memory M1, wherein start addresses of video and audio parts of the still picture and their sizes are recorded as above (S19). And, the control unit 50 records the whole file management data containing the completed VOBI in the storage media (S21), which finishes the creation of the VOBI.

Figure 11:
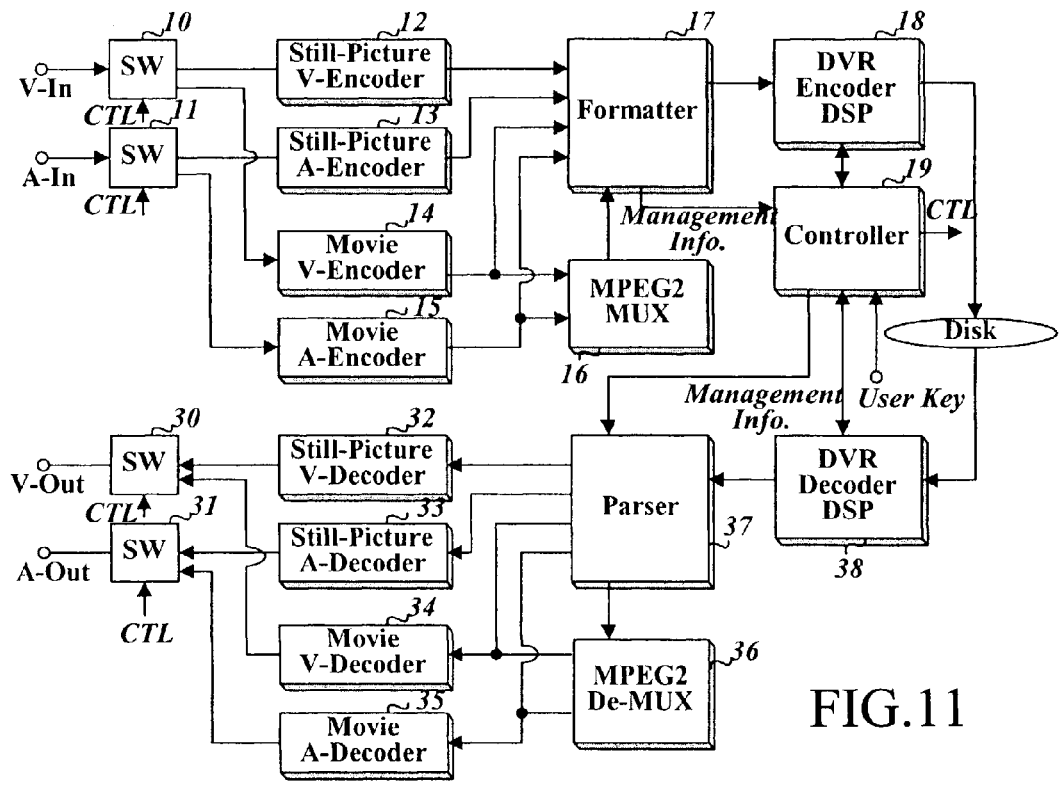
FIG. 11 is a block diagram of a disk device in which a method of recording still pictures onto a rewritable recording medium in accordance with an embodiment of the present invention is embodied.

FIG. 11 is a block diagram of a disk device in which a method of recording still pictures onto a rewritable recording medium in accordance with an embodiment of the present invention is embedded.

The disk device of FIG. 11, e.g., a DVR can record video/audio data and management information for searching and reproduction control onto a rewritable recording medium.

The disk device comprises, as shown in FIG. 11, an input processing module, an output processing module, and a controller 19 conducting overall system control. The input processing module is composed of two input switching units 10 and 11, a still picture video 12 and a still picture audio encoder 13, a movie video 14 and a movie audio encoder 15, an MPEG 2 muxer 16, a formatter 17, and a DVR encoding DSP 18 while the output processing module is composed of two output switching units 30 and 31, a still picture video 32 and a still picture audio decoder 33, a movie video 34 and a movie audio decoder 35, an MPEG 2 demuxer 36, a parser 37, and a DVR decoding DSP 38, all operatively coupled.

The two input switching units 10 and 11 selectively connect their input signals to the still picture video 12 and the still picture audio encoder 13 or the movie video 14 and the movie audio encoder 15 in response to a switching control 'CTL' of the controller 19. The still picture encoders 12 and 13 encode video data from the first switching unit 10 to JPEG or TIFF format and audio data from the second switching unit 11 to PCM, u-Law PCM, or IMA-ADPCM format, respectively as a DSC does.

The movie encoders 14 and 15 encode video data from the first switching unit 10 to MPEG 2 format and audio data from the second switching unit 11 to AC-3, MPEG 1 layer 2, or LPCM format, respectively. The MPEG 2 muxer 16 multiplexes the encoded video and audio data from the movie video 14 and the movie audio encoder 15 to produce MPEG 2 stream that is directed to the formatter 17.

For motion-picture input, a user can set a still-picture recording mode that is supported by a DVR. In that mode, MPEG2-formatted video data and AC3-, MPEG1 layer2-formatted, or LPCM audio data from the movie video 14 and the movie audio encoder 15 are applied to the formatter 17 directly not passing through the MPEG 2 muxer 16. The formatter 17 is able to convert each frame of motion pictures to still picture.

In case that the encoded still picture video and audio data are inputted from the still picture encoders 12 and 13, the formatter 17 segments or groups input data to yield successive data units, adds necessary head information to each data unit, and transmits them sequentially to the DVR encoding DSP 18. The data unit has a size suitable for a recording unit area of a rewritable recording disk. Furthermore, the formatter 17 produces management information for searching for and controlling reproduction of the re-sized still picture video and audio data. The produced management information is delivered to the controller 19.

The formatter 17 also conducts the same resizing and management information creating operation for the still-picture video and audio data that are converted from motion picture data as explained before.

In case that the encoded motion picture video and audio data are inputted from the movie encoders 14 and 15 and the MPEG 2 stream are from the MPEG 2 muxer 16 at the same time, the formatter 17 selects the encoded data or the MPEG 2 stream to segment or group the selected data to yield successive data units, adds necessary head information to each data unit, and transmits them sequentially to the DVR encoding DSP 18. The data unit has a size suitable for a recording unit area of a rewritable recording disk. The formatter 17 also produces management information for searching for and controlling reproduction of the re-sized motion picture video and/or audio data. The produced management information is delivered to the controller 19.

The DVD encoding DSP 18 constructs ECC (Error Correction Code) blocks with the successive data units having still or motion pictures, thumbnails and audio data and then modulates data of ECC blocks to corresponding recording waveforms that will form mark/space patterns on the surface of the rewritable recording disk. At this time, the controller 19 creates management information to group still pictures and associated audio data or thumbnails. The group is determined based on an attribute or subject of data objects, namely still pictures and/or audio data.

The created group management information is written in a still-picture information file (*.stli) under a directory 'STILLINF' that is newly defined by the present invention as shown in FIG. 2. And, additional information related with management of still picture groups (SPGs) is created and written in navigation data fields defined for a DVR.

In addition, while or after video and/or audio data are recorded, the controller 19 records the management information received from the formatter 17 or created by itself onto the rewritable recording disk through the DVR encoding DSP 18.

Described below are various still-picture grouping methods conducted by the above-explained recording process.

Figure 12:
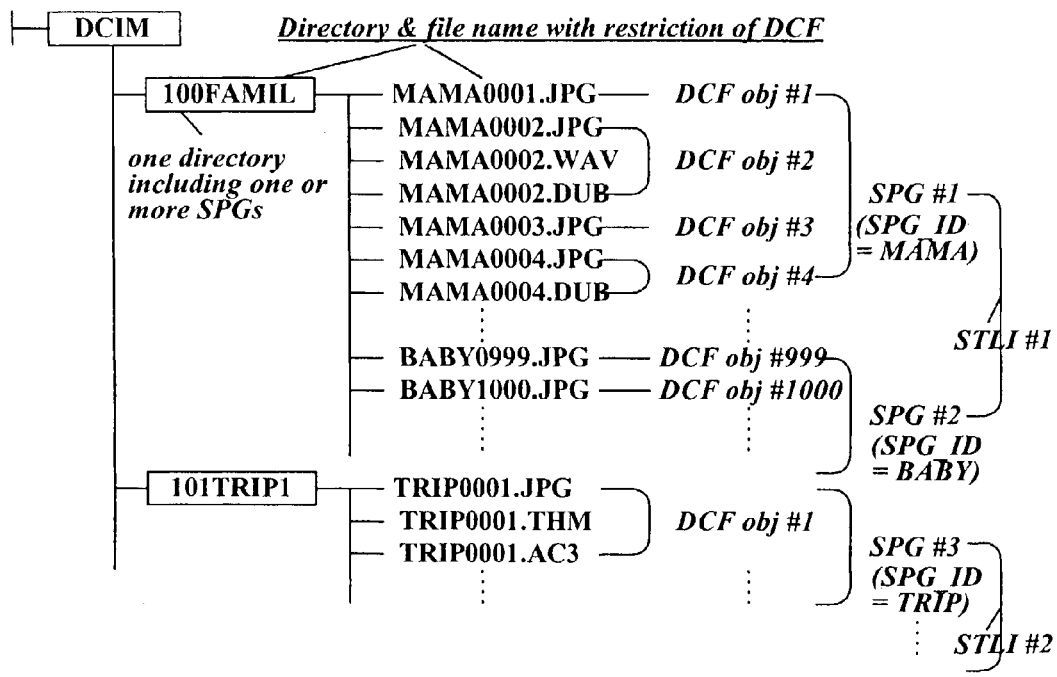
FIGS. 12 to 15 show a schematic still-picture recording process and group management information related with a still picture grouping in accordance with a first embodiment of the present invention.

FIGS. 12 to 15 show a schematic still-picture recording process and group management information related with a still picture grouping in accordance with a first embodiment of the present invention. In this embodiment, the controller 17 records still pictures, and associated audio data and thumbnails, etc. in the DCF structure adopted by a DSC, as shown in FIG. 12. At this time, still pictures and associated audio data and thumbnails with same attribute have same string in their filenames to designate them to a single SPG.

A directory, e.g., '100FAMIL' with three numeric digits and five character digits can include data files belonging to different SPGs. The three numeric digits should be unique, for instance, one among 100 to 999, and the five character digits are arbitrarily chosen by a user.

The recorded file has a filename whose length may be 8 digits long excluding its extension. The filename may be composed of four numeric digits and four character digits, for example. While the four character digits are arbitrarily chosen by a user the four numeric digits should be different from those of other files if file extensions are same.

Explaining the recording example of FIG. 12, the directory '100FAMIL' includes a still picture file 'MAMA0001.JPG', another still picture file 'MAMA0002.JPG', and a real-time audio file 'MAMA0002.WAV' and a dubbed audio file 'MAMA0002.DUB' associated with the file 'MAMA0002.JPG'. A file or files with same filename constitute a DCF object, so that the first DCF object consists of only the file 'MAMA0001.JPG' while the second DCF object consists of three files 'MAMA0002.JPG', 'MAMA0002.WAV' and 'MAMA0002.DUB'.

The files having common 4-character string, e.g., 'MAMA' in their filenames constitute a single SPG and the common string is used as a group identifier.

Figure 13:
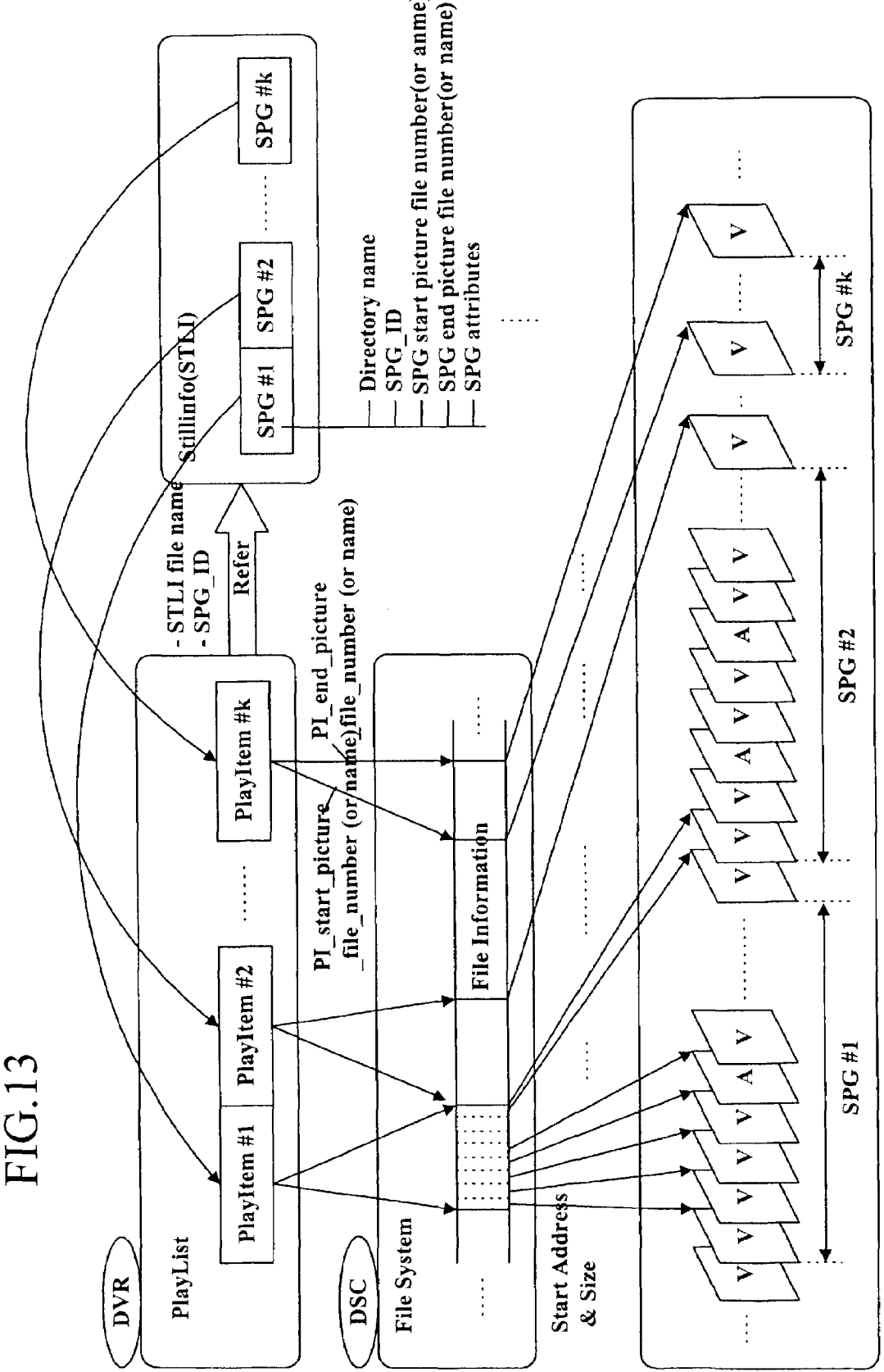

The group specifying information and attribute information for each SPG are written a still-picture information file (*.stli) under the directory 'STILLINF', as shown in FIG. 13.

The still-picture information file (*.stli) includes, for each SPG, a directory name where the SPG is, a SPG identifier 'SPG_ID', a start and an end file number (or filename) of the SPG, and attribute information of the SPG. The attribute information can be written in a playitem, referring to a SPG, included in a playlist file that is defined by a DVR.

Figure 14:
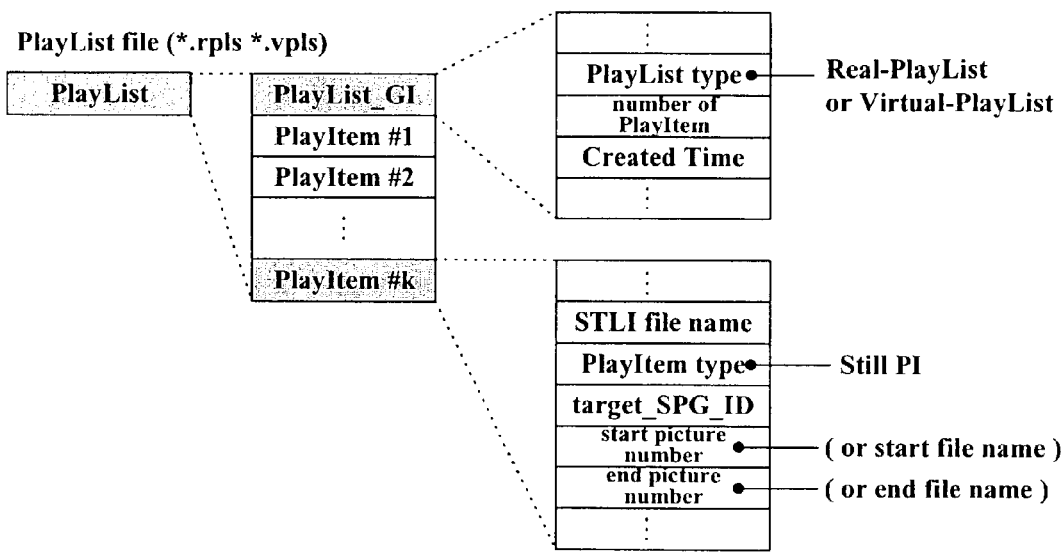

The playlist file (*.rpls,*.vpls) consists of a playlist general information 'PlayList_GI' and a plurality of playitems as shown in FIG. 14. The playlist general information includes a playlist type, the number of playitems, created time, and so on. Each playitem includes filename of an associated still-picture information file, a playitem type, an identifier of a target SPG, and a start and an end picture number (or filename), etc.

Figure 15:
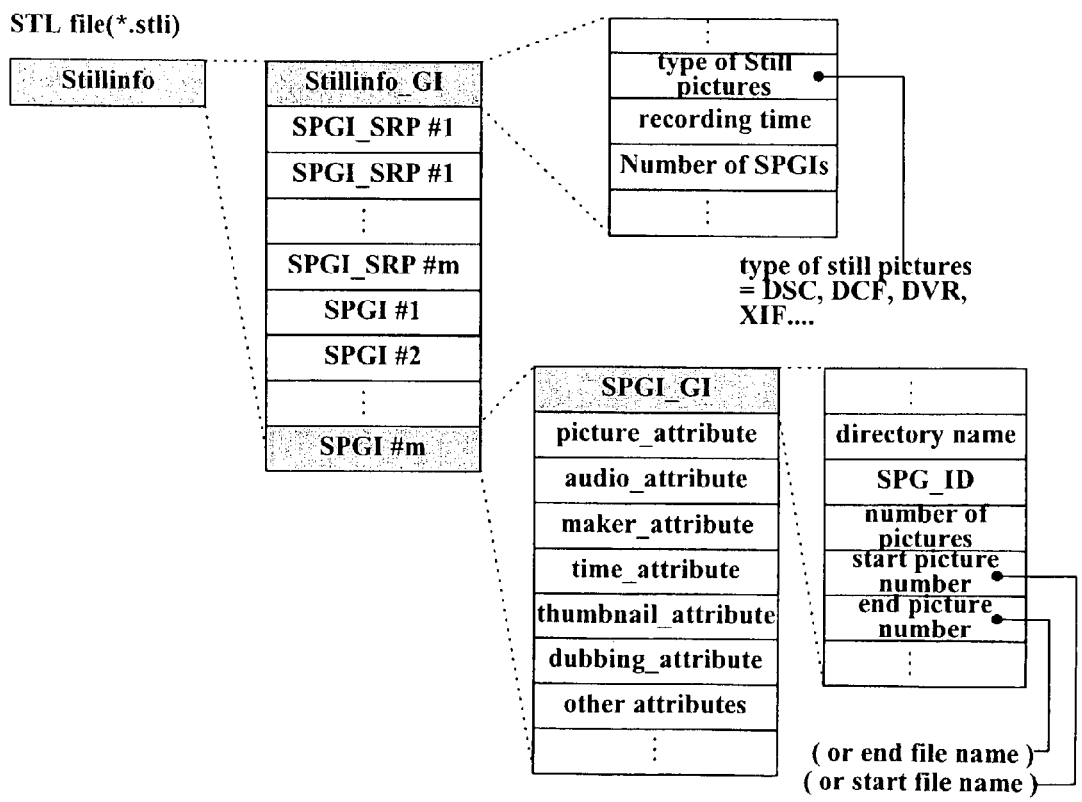

The still-picture information file (*.stli) is structure as shown in FIG. 15. The still-picture information file is composed of general information of still-picture information 'Stillinfo_GI', a plurality of SPG information search pointers 'SPGI_SRP #k', and plural pieces of SPG information 'SPGI #k'. The general information of still-picture information 'Stillinfo_GI' includes type of still pictures, recording time, the number of SPGIs, and so on.

Each SPGI, pointed by a SPG information search pointer, includes SPGI general information and an attribute table where respective attributes of picture, audio, maker, time, thumbnail, dubbed audio, and others are written.

The picture attribute includes a coding mode (JPEG/TIFF/MPEG), an aspect ratio (4:3/16:9), a YCrCb sampling rate (4:2:2/4:2:0), a resolution (HDTV:1920×1080/SXGA:1280×960/XGS:1024×768/ . . . ), and the audio attribute includes a coding mode (PCM/IMA-ADPCM/AC-3/MPEG1-L2), a sampling rate (8 kHz/11.025 kHz/48 kHz/96 kHz/ . . . ), the number of channels (1/2/4/5.1/ . . . ), and a quantization level (8/16/24 bits).

The maker attribute includes manufacturer's code (LG/Samsung/MEI/ . . . ), a model name, and a recording source, and the time attribute includes original creation time, etc. The thumbnail attribute is almost similar to the picture attribute and the dubbed audio attribute is almost similar to the audio attribute as well. The other attribute includes important attributes defined in EXIF and DCF format.

The SPGI general information 'SPGI_GI' includes a directory name where a SPG is, a SPG identifier 'SPG_ID', the number of pictures, a start and an end file number (or filename) of the SPG, and so forth.

Using the above-explained management information related with a SPG, still pictures and audio data files belonging to a SPG identified by a SPG identifier 'SPG_ID' and information written in a still-picture information file pointed by a playitem selected from a playlist can be easily found and then presented sequentially.

The attribute information can be included in a still picture and an associated audio file. In this case, an electronic machine having adopted the DSC file system uses the attribute information included in still pictures and their related audio files while another electronic machine having adopted the DVR file system uses the attribute information written in SPG information 'SPGI #k' included in a still-picture information file (*.stli).

Figure 16:
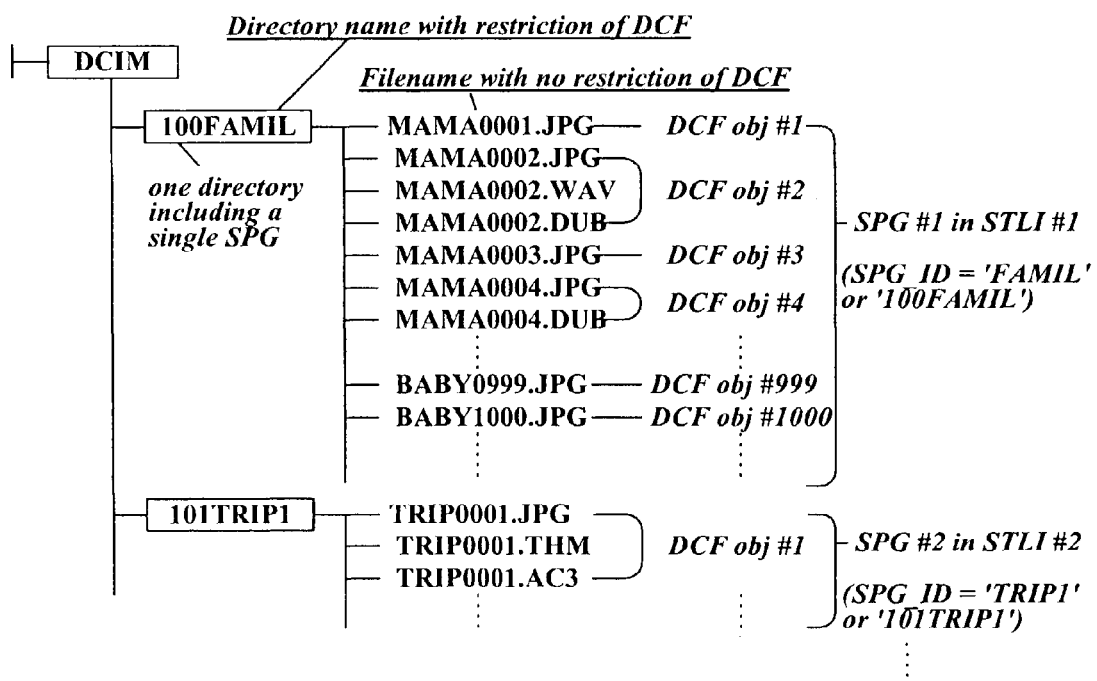
Figure 17:
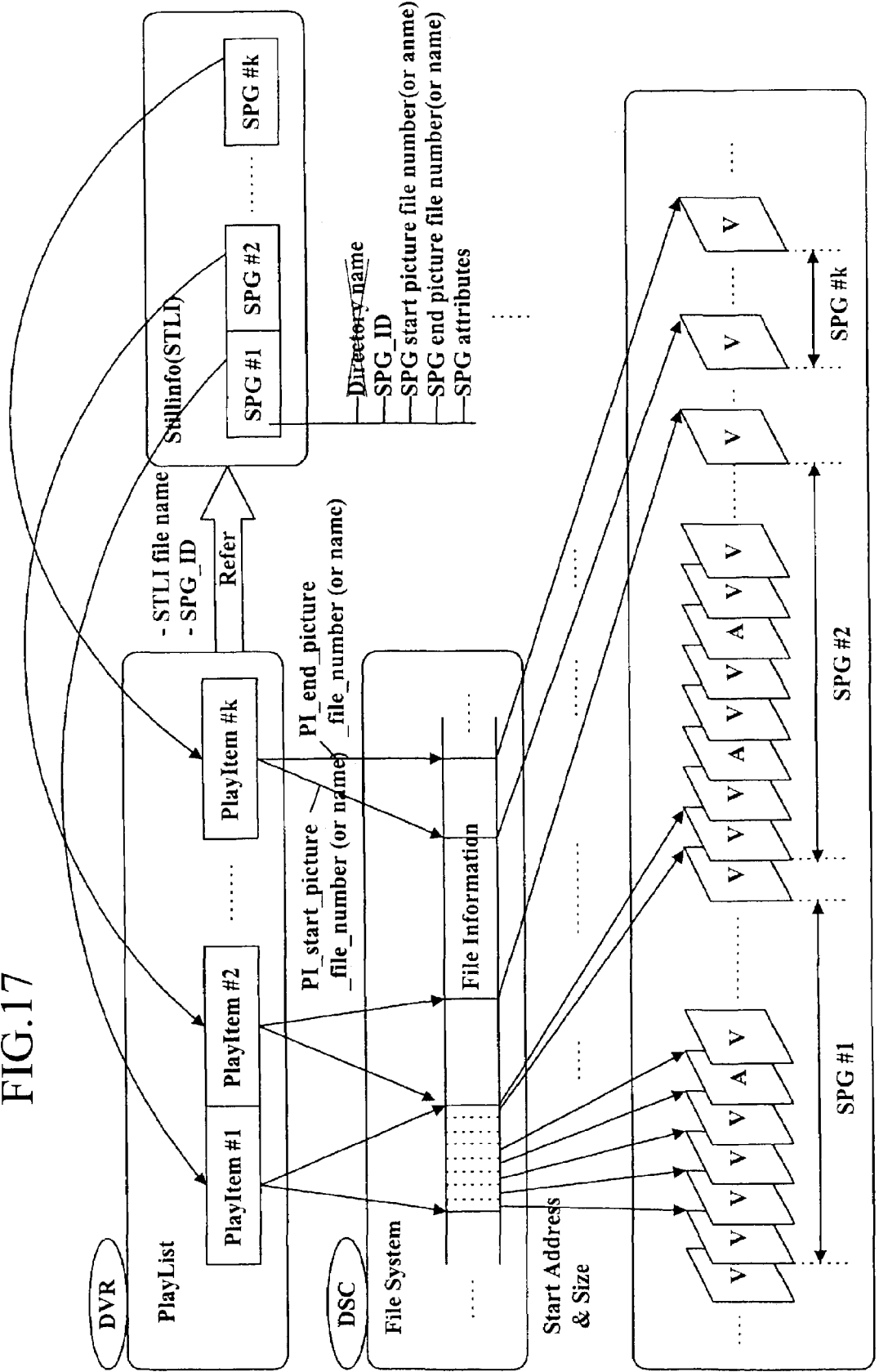

FIGS. 16 to 18 show a schematic still-picture recording process and group management information related with a still picture grouping in accordance with a second embodiment of the present invention. In this embodiment, the controller 17 records still pictures, and associated audio data and thumbnails, etc. in the DCF structure adopted by a DSC, as shown in FIG. 16. At this time, all still pictures and associated audio data and thumbnails with same attribute are written under a same directory to group all files under a directory to a single SPG. The filename is not restricted contrary to the first embodiment, but the rule of DCF object is still observed.

In this embodiment, the files belonging to same SPG need not have same string in their filenames because all files belonging to same SPG are under a same directory. In the recording example of FIG. 16, the files belonging to the first SPG 'SPG #1' have different strings 'MAMA' and 'BABY' in their filenames.

In addition, a directory name or its last five characters are used as an identifier of a SPG because SPGs are differentiated from each other by directories.

The group specifying information and attribute information for each SPG are written a still-picture information file (*.stli) under the directory 'STILLINF', as shown in FIG. 17. However, unlike the embodiment of FIG. 13, a directory name is not written in the still-picture information file (*.stli) because a directory name is an identifier of a SPG.

The attribute information written in the still-picture information file can be also written in a playitem, related with a SPG, included in a playlist file that is defined by a DVR.

The playlist file (*.rpls,*.vpls) in the second embodiment has totally same structure that the first embodiment has as shown in FIG. 14. The structure of a still-picture information file of this embodiment is also same with the first embodiment except that SPGI general information does not include a directory name field. FIG. 18 shows the structure of a still-picture information file according to the second embodiment.

FIG. 19 shows a file recording example according to the third embodiment of the present invention. This embodiment is the same as the second embodiment except that a subdirectory to accommodate a single SPG is created under a directory of which name is ruled by DCF. The subdirectory is arbitrarily named by a user without any restriction. Needless to say, a subdirectory pathname is used as an identifier of a SPG.

Figure 20:
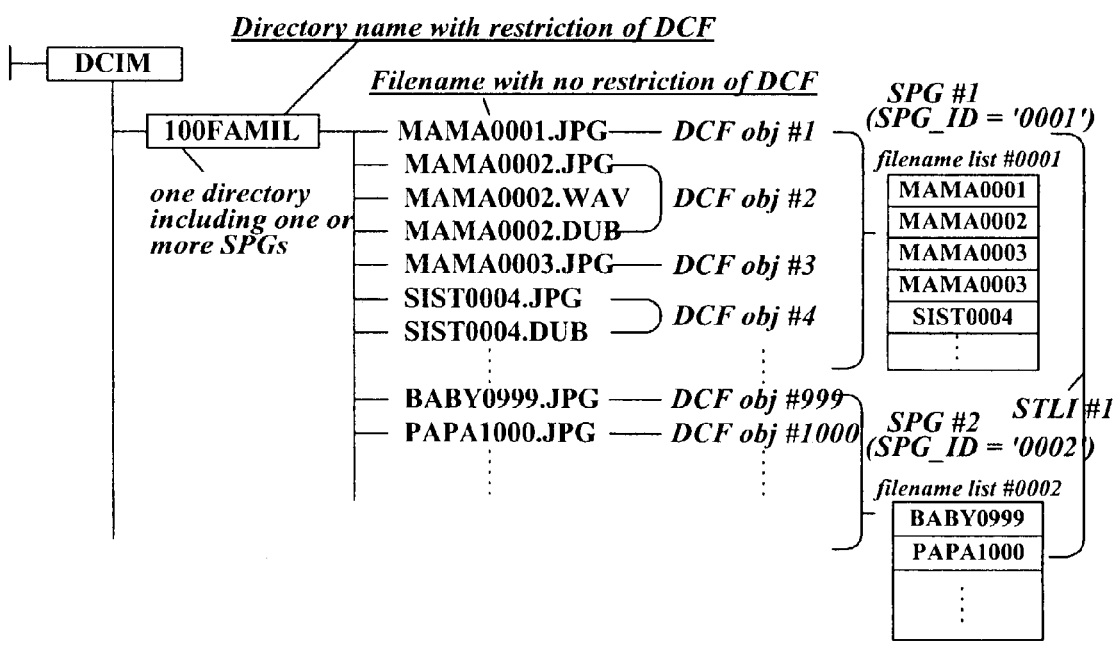
FIGS. 20 to 22 show a schematic still-picture recording process and group management information related with a still picture grouping in accordance with a fourth embodiment of the present invention.
Figure 21:
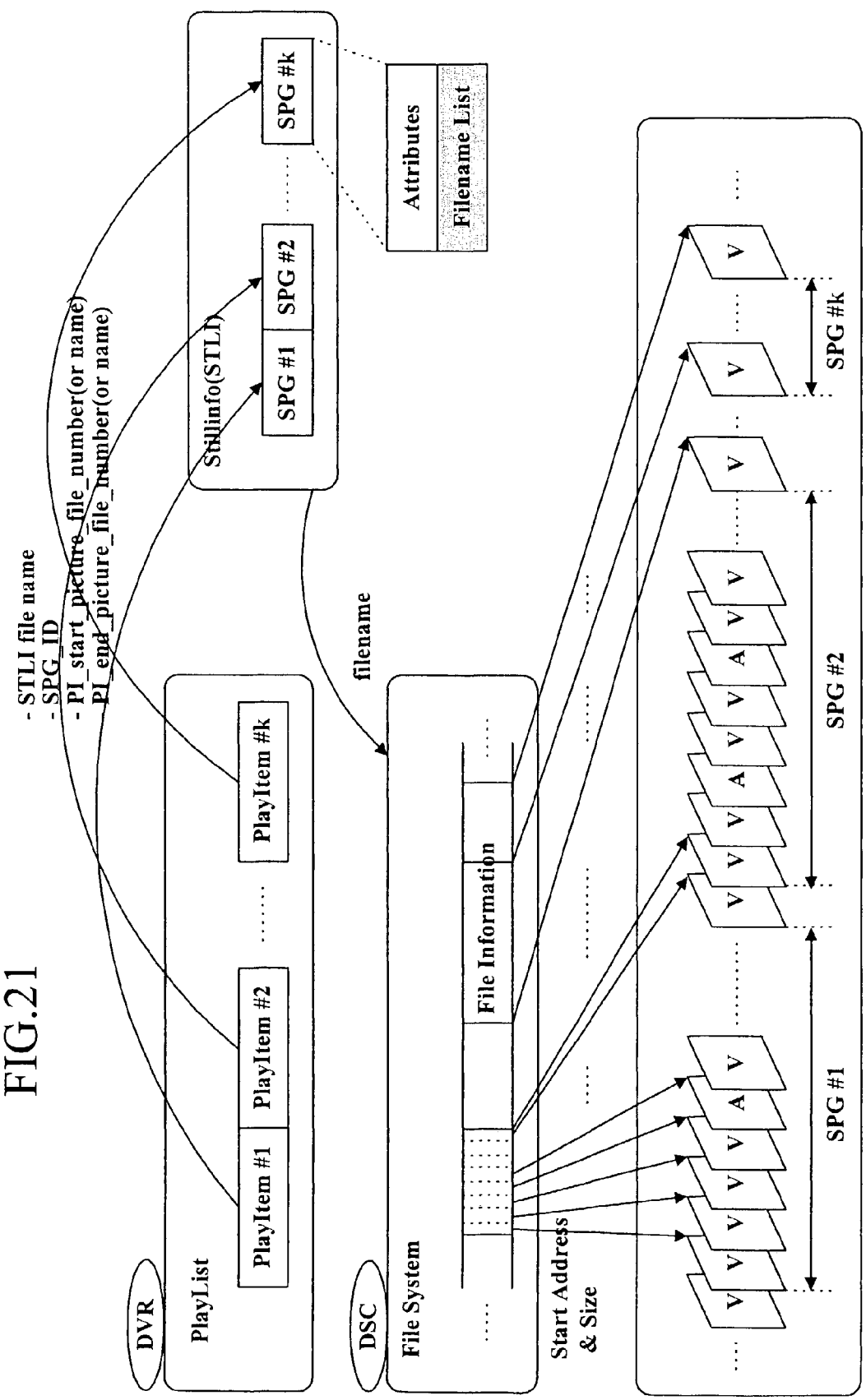
Figure 22:
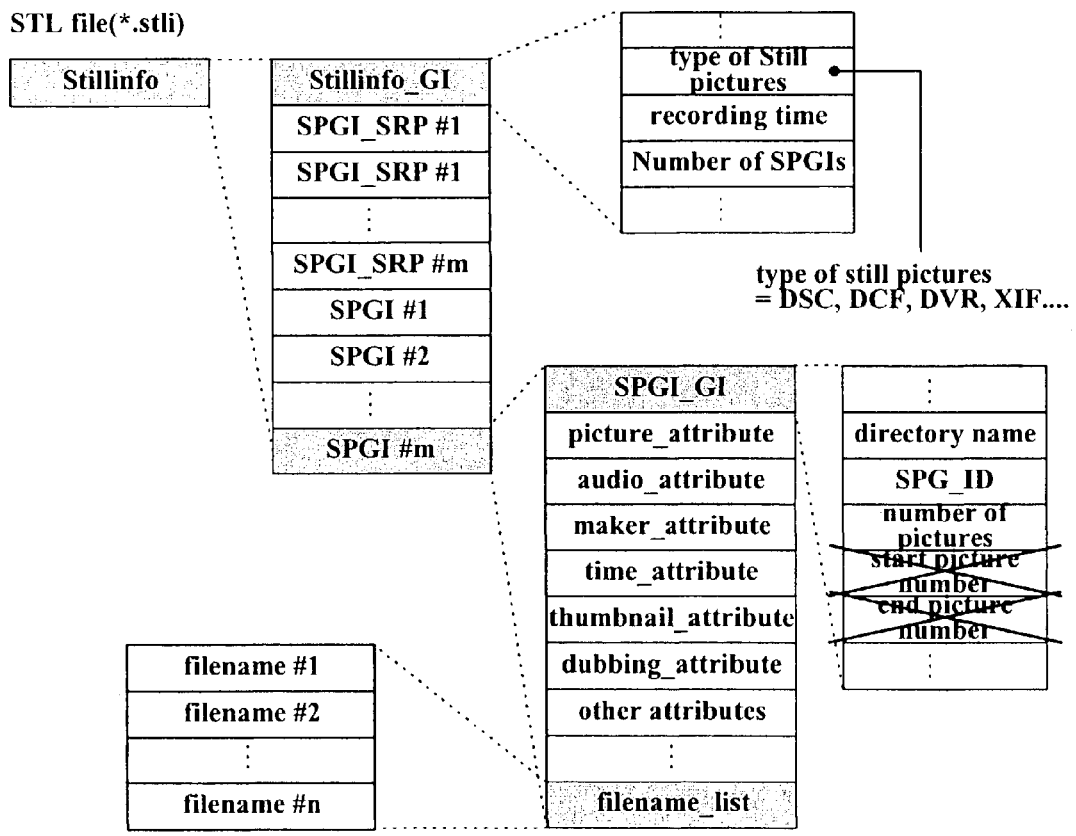
Figure 23:
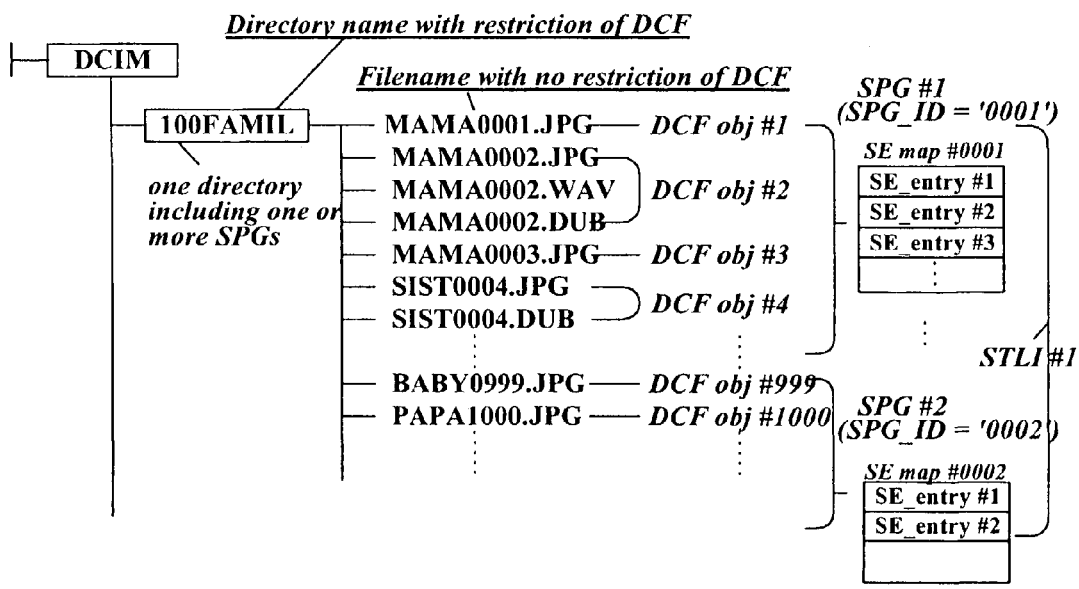
Figure 24:
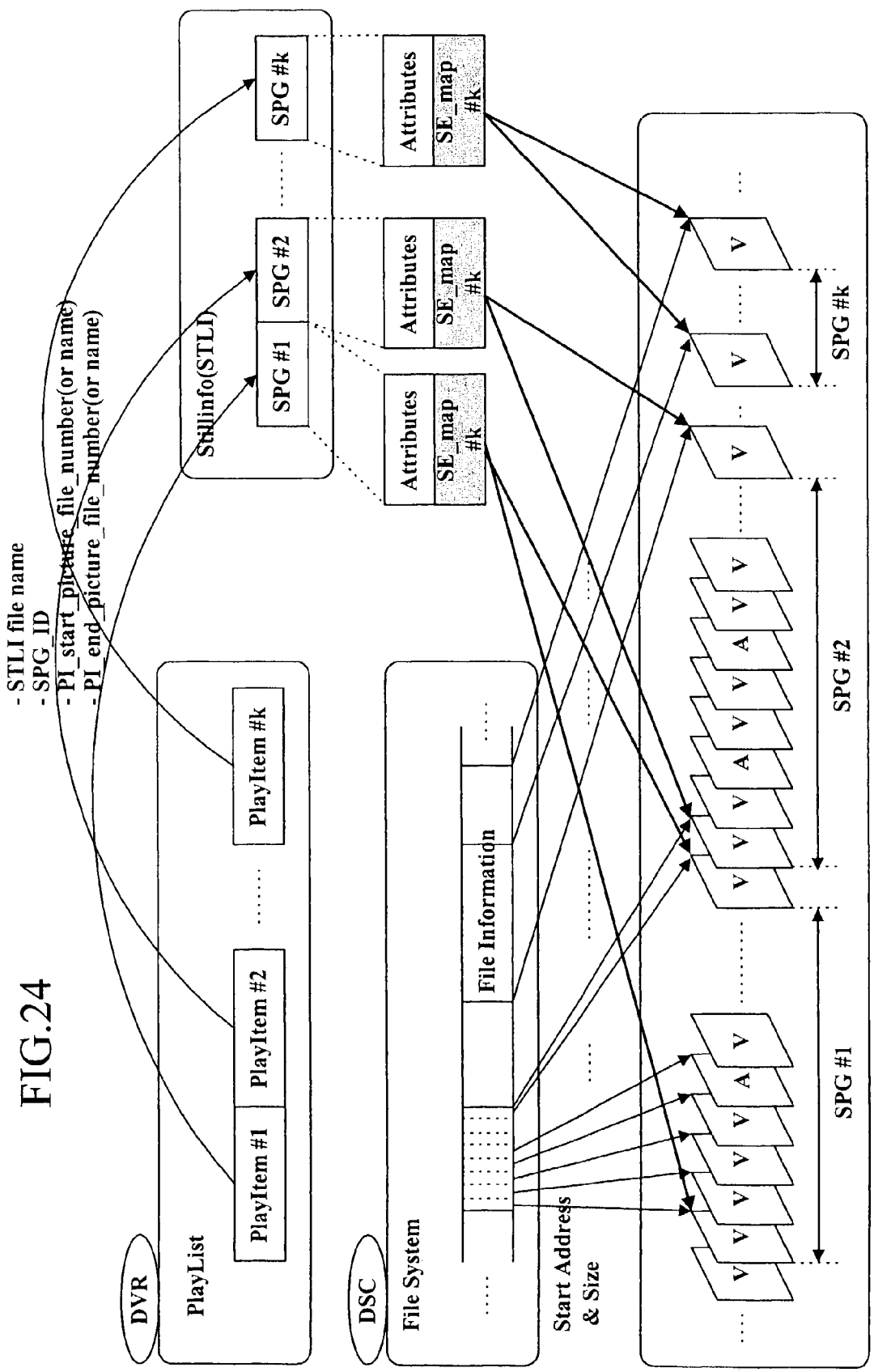

FIGS. 20 to 22 show a schematic still-picture recording process and group management information related with a still picture grouping in accordance with a fourth embodiment of the present invention. In this embodiment, the controller 17 records still pictures, and associated audio data and thumbnails, etc. in the DCF structure adopted by a DSC, as shown in FIG. 20. At this time, still pictures and associated audio data and thumbnails with same attribute are written under a same directory however they need not a common string in their filenames. The directories are named under the DCF rule. However, the filenames are named by a user with no restriction of DCF rule.

In this embodiment, a plurality of SPGs can be included in a single directory and the files in a same SPG need not have the same string in their filenames. Therefore, a file list including filenames belonging to a same SPG must be stored in a SPG management information area, e.g., a still-picture information file, and an identifier of a SPG uses serial number as shown in FIG. 20. Each file list can include file number instead of filename. The still-picture information file (*.stli) includes, for each SPG, attribute information as well as the file list as shown in FIG. 21.

In addition, because the still-picture information file (*.stli) includes a file list in SPG information field, the SPGI general information does not include a start and an end picture number (or filename) field, as shown in FIG. 22.

FIGS. 23 to 26 show a schematic still-picture recording process and group management information related with a still picture grouping in accordance with the fifth embodiment of the present invention. This fifth embodiment is the same as the fourth embodiment except that the former has an entry map having information on file entries belonging to a same SPG.

The fifth embodiment is independent of a file system handling recorded files because a filename is not used for a file entry whereas the fourth embodiment is not independent of a file system handling recorded files. The SPGI general information reserved in a still-picture information file (*.stli) does not include a directory name, and a start and end picture number as its member as shown in FIG. 25.

Each entry of the entry map, as shown in FIG. 26, consists of a start address and size of a still picture, and size and playback time of at least one associated audio data file, if there is any. The size of audio data can be replaced with its filename.

Needless to say, the above-explained still-picture grouping embodiments are applicable to a disk device structured differently from the disk device of FIG. 11.

The above-explained still-picture grouping method ensures that a user easily and rapidly finds many still pictures that have been obtained in the same photographing condition.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt to a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

The foregoing description and the drawings are regarded as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer of alternative inventive concepts that are included in the contents of the application and could be defined by claims differing in scope from the following claims, which different claims may be adopted subsequently during prosecution, for example, for the purposes of a continuation or divisional application.

What is claimed is:

1. A method for organizing still picture management data via an apparatus including a controller and a recording device, the method comprising:
   providing, via the controller, a plurality of Object Information in a storage unit, each Object Information pertaining to multiple Objects corresponding to still pictures that have common encoding attributes, a respective Object Information including common video attribute information; and
   recording, via the recording device, the Object information including the common encoding attributes for the multiple objects without additionally keeping or duplicating the encoding attributes for each of the Objects corresponding to the still pictures that have the common encoding attributes,
   wherein the multiple Objects are managed based on the Object Information via the controller, and
   wherein the Object information for managing the multiple Objects is separated from the multiple objects.

2. The method of claim 1, wherein said respective Object Information further includes information indicating a number of Objects within a group, the number being equal to or less than a maximum allowable number.

3. The method of claim 1, wherein said respective Object Information further includes size information of corresponding still pictures within a group and corresponding audio data assigned to said respective Object Information.

4. The method of claim 1, further comprising:
   creating a plurality of CIs (Cell Informations), each CI corresponding to one of the Object Information,
   wherein each CI is created when a corresponding Object Information is closed for a new Object Information to be formed.

5. The method of claim 1, wherein the video attribute information identifies at least one of the following for the respective Object Information: a video compression mode, a TV system mode, an aspect ratio, an analog protection system mode, and a video resolution.

6. The method of claim 1, wherein the multiple Objects in the respective Object Information corresponds to the still pictures and corresponding audio signals with common attributes, and the respective Object Information includes audio attribute information associated with the corresponding audio signals.

7. The method of claim 6, wherein the audio attribute information identifies at least one of the following for the respective Object Information: an audio coding mode, a dynamic range control mode, a sampling frequency, and a number of audio channels.

8. The method of claim 1, wherein the storage unit is one of an optical disk and a memory separate from the optical disk for storing data associated with the optical disk.

9. The method of claim 1, further comprising:
   creating a new Object Information when a number of Objects belonging to a currently processing Object Information reaches a maximum allowable number.

10. The method of claim 1, wherein the respective Object Information further includes start address information of a first Object assigned to the respective Object Information.

11. A non-transitory computer-readable medium encoded with a computer program configured to be read by a reproducing device, the computer-readable medium comprising:
    a plurality of Object Information on the computer-readable storage medium, each Object Information pertaining to multiple Objects corresponding to still pictures that have common encoding attributes, and a respective Object Information including common video attribute information,
    wherein the Object information including the common encoding attributes is recorded for multiple Objects without keeping or duplicating the encoding attributes for each of the Objects corresponding to the still pictures that have the common encoding attributes, and
    wherein the multiple Objects are managed based on the Object Information, and the Object information for managing the multiple Objects is separated from the multiple Objects.

12. The computer-readable medium of claim 11, wherein said respective Object Information further includes information indicating a number of Objects within a group, the number being equal to or less than a maximum allowable number.

13. The computer-readable medium of claim 11, wherein said respective Object Information further includes size information of corresponding still pictures and corresponding audio data assigned to said respective Object Information.

14. The computer-readable medium of claim 11, further comprising:
    a plurality of CIs (Cell Informations) stored on the computer-readable storage medium, each CI corresponding to one of the Object Information,
    wherein each CI is created when a corresponding Object Information is closed for a new Object Information to be formed.

15. The computer-readable medium of claim 11, wherein the video attribute information identifies at least one of the following for the respective Object Information: a video compression mode, a TV system mode, an aspect ratio, an analog protection system mode, and a video resolution.

16. The computer-readable medium of claim 11, wherein the multiple Objects in the respective Object Information corresponds to the still pictures and corresponding audio signals with common attributes, and the respective Object Information includes audio attribute information associated with the corresponding audio signals.

17. The computer-readable medium of claim 16, wherein the audio attribute information identifies at least one of the following for the respective Object Information: an audio coding mode, a dynamic range control mode, a sampling frequency, and a number of audio channels.

18. The computer-readable medium of claim 11, wherein the computer-readable storage medium is one of an optical disk and a memory separate from the optical disk for storing data associated with the optical disk.

19. The computer-readable medium of claim 11, further comprising:
a new Object Information that was created and stored on the computer-readable storage medium when a number of Objects belonging to a currently processing Object Information reaches the maximum allowable number.

20. The computer-readable medium of claim 11, wherein the respective Object Information further includes start address information of a first Object assigned to the respective Object Information.

21. An apparatus for organizing still picture management data, the apparatus comprising:
an optical pickup configured to record information on an optical disc, and/or reproduce the information from the optical disc;
a signal processor configured to process still pictures; and
a controller, coupled to the signal processor, and configured to control a recording of management information, the management information including a plurality of Object Information, each Object Information pertaining to multiple Objects corresponding to still pictures that have common encoding attributes, a respective Object Information including common video attribute information,
wherein the Object information including the common encoding attributes is recorded for multiple Objects without keeping or duplicating the encoding attributes for each of the Objects corresponding to the still pictures that have the common encoding attributes,
wherein the multiple Objects are managed based on the Object information, and
wherein the Object information for managing the multiple Objects is separated from the multiple Objects.

22. The apparatus of claim 21, further comprising:
a memory configured to store the management information to be recorded on the optical disc.

23. The apparatus of claim 21, wherein the controller is further configured to control the signal processor so that still pictures and audio data linked to the still pictures are properly recorded on the optical disc.

24. The apparatus of claim 23, wherein the controller is further configured to create the management information including information for indicating a number of Objects within the group, the number being equal to or less than a maximum allowable number, and for indicating size information of still pictures and a corresponding audio data assigned to said respective Object Information.

25. The apparatus of claim 21, wherein the signal processor comprises:
an analog signal processing unit configured to filter and digitize a high-frequency analog signal from the optical pickup and convert digital data into an analog signal;
a digital signal processing unit configured to encode and decode an error correction code block and issue a control signal to the optical pickup based on a result of data decoding; and
an A/V (audio/video) processing unit configured to decode input A/V data and encode an A/V signal into A/V data.

26. A method for reproducing still pictures in a reproducing apparatus including a receiver and a controller, the method comprising:
receiving, via the receiver, a command requesting a reproduction of still pictures recorded in a recording medium;
reading, via the controller, recorded Object information pertaining to multiple Objects corresponding to still pictures that have common encoding attributes, said recorded Object information including the common encoding attributes for the multiple Objects without additionally keeping or duplicating the encoding attributes for each of the Objects corresponding to the still pictures that have the common encoding attributes, a respective Object Information including common video attribute information; and
reproducing the still pictures based on the Object information,
wherein the Object information for managing the multiple objects is separated from the multiple objects.

27. The method of claim 26, wherein said respective Object Information further includes information indicating a number of Objects within a group, the number being equal to or less than the maximum allowable number.

28. The method of claim 26, wherein the video attribute information identifies at least one of the following for the respective Object Information: a video compression mode, a TV system mode, an aspect ratio, an analog protection system mode, and a video resolution.

29. The method of claim 26, wherein the multiple Objects in the respective Object Information corresponds to the still pictures and corresponding audio signals with common attributes, and the respective Object Information includes audio attribute information associated with the corresponding audio signals.

30. The method of claim 29, wherein the audio attribute information identifies at least one of the following for the respective Object Information: an audio coding mode, a dynamic range control mode, a sampling frequency, and a number of audio channels.

31. An apparatus for reproducing still pictures, the apparatus comprising:
a receiver configured to receive a command requesting a reproduction of still pictures recorded in a recording medium; and
a reproducing device configured to read recorded Object information pertaining to multiple Objects corresponding to still pictures that have common encoding attributes, said recorded Object information including the common encoding attributes for the multiple Objects without additionally keeping or duplicating the encoding attributes for each of the Objects corresponding to the still pictures that have the common encoding attributes, and to reproduce the multiple Objects based on the Object Information, a respective Object Information including common video attribute information, and
wherein the Object Information for managing the multiple Objects is separated from the multiple Objects.

32. The apparatus of claim 31, wherein said respective Object Information further includes information indicating a number of Objects within a group, the number being equal to or less than a maximum allowable number.

33. The apparatus of claim 31, wherein the video attribute information identifies at least one of the following for the respective Object Information: a video compression mode, a TV system mode, an aspect ratio, an analog protection system mode, and a video resolution.

34. The apparatus of claim 31, wherein the multiple Objects in the respective Object Information correspond to the still pictures and corresponding audio signals with common attributes, and the respective Object Information includes audio attribute information associated with the corresponding audio signals.

35. The apparatus of claim 34, wherein the audio attribute information identifies at least one of the following for the respective Object Information: an audio coding mode, a dynamic range control mode, a sampling frequency, and a number of audio channels.

\* \* \* \* \*